United States Patent
Sagawa

(10) Patent No.: US 8,204,326 B2
(45) Date of Patent: Jun. 19, 2012

(54) DATA PROCESSING APPARATUS, DATA PROCESSING METHOD AND DATA PROCESSING PROGRAM, ENCODING APPARATUS, ENCODING METHOD AND ENCODING PROGRAM, AND DECODING APPARATUS, DECODING METHOD AND DECODING PROGRAM

(75) Inventor: Yusuke Sagawa, Tokyo (JP)

(73) Assignee: Sony Corporation, Tokyo (JP)

( * ) Notice: Subject to any disclaimer, the term of this patent is extended or adjusted under 35 U.S.C. 154(b) by 840 days.

(21) Appl. No.: 12/145,215

(22) Filed: Jun. 24, 2008

(65) Prior Publication Data

US 2009/0010553 A1   Jan. 8, 2009

(30) Foreign Application Priority Data

Jul. 5, 2007   (JP) ................................ P2007-177155

(51) Int. Cl.
*G06K 9/36* (2006.01)
(52) U.S. Cl. .................. 382/246; 382/238; 375/240.12; 375/240.21; 375/240.24
(58) Field of Classification Search .......................... None
See application file for complete search history.

(56) References Cited

U.S. PATENT DOCUMENTS

| 5,319,387 | A | 6/1994 | Yoshikawa |
| 2005/0053154 | A1* | 3/2005 | Yamaguchi et al. ...... 375/240.21 |
| 2006/0146183 | A1* | 7/2006 | Nakagami et al. ......... 348/397.1 |
| 2006/0182315 | A1* | 8/2006 | Cha .............................. 382/107 |

FOREIGN PATENT DOCUMENTS

JP   5-127809   5/1993

* cited by examiner

*Primary Examiner* — Claire X Wang
*Assistant Examiner* — Siamak Harandi
(74) *Attorney, Agent, or Firm* — Finnegan, Henderson, Farabow, Garrett & Dunner, L.L.P.

(57) ABSTRACT

A data processing apparatus includes a motion vector storage unit, an index value generating unit, a storage control unit, and a motion vector reading unit. The motion vector storage unit stores a motion vector in a unit block area. The index value generating unit generates the index value corresponding to a position of the unit block at upper left and upper right corners of an object block for which a prediction motion vector is to be acquired, on the basis of a size of the object block. The storage control unit copies a motion vector of an adjacent block by each of the unit block area and stores the copied motion vector. The motion vector reading unit obtains the index value indicating the unit block area on the basis of the index value. The prediction motion vector is obtained on the basis of the motion vector.

20 Claims, 22 Drawing Sheets

FIG. 7

| mb_type | sub_mb_type | lft_idx[3:0] | rht_idx[3:0] |
|---|---|---|---|
| 16 × 16 | – | 4'd0 | 4'd3 |
| 16 × 8 | – | 4'd0 | 4'd3 |
|  |  | 4'd8 | 4'd11 |
| 8 × 16 | – | 4'd0 | 4'd1 |
|  |  | 4'd2 | 4'd3 |
| 8 × 8 | 8 × 8 | 4'd0 | 4'd1 |
|  |  | 4'd2 | 4'd3 |
|  |  | 4'd8 | 4'd9 |
|  |  | 4'd10 | 4'd11 |
| 8 × 8 | 8 × 4 | 4'd0 | 4'd1 |
|  |  | 4'd2 | 4'd3 |
|  |  | 4'd4 | 4'd5 |
|  |  | 4'd6 | 4'd7 |
|  |  | 4'd8 | 4'd9 |
|  |  | 4'd10 | 4'd11 |
|  |  | 4'd12 | 4'd13 |
|  |  | 4'd14 | 4'd15 |
| 8 × 8 | 4 × 8 | 4'd0 | 4'd0 |
|  |  | 4'd1 | 4'd1 |
|  |  | 4'd2 | 4'd2 |
|  |  | 4'd3 | 4'd3 |
|  |  | 4'd8 | 4'd8 |
|  |  | 4'd9 | 4'd9 |
|  |  | 4'd10 | 4'd10 |
|  |  | 4'd11 | 4'd11 |
| 8 × 8 | 4 × 4 | 4'd0 | 4'd0 |
|  |  | 4'd1 | 4'd1 |
|  |  | 4'd2 | 4'd2 |
|  |  | 4'd3 | 4'd3 |
|  |  | 4'd4 | 4'd4 |
|  |  | 4'd5 | 4'd5 |
|  |  | 4'd6 | 4'd6 |
|  |  | 4'd7 | 4'd7 |
|  |  | 4'd8 | 4'd8 |
|  |  | 4'd9 | 4'd9 |
|  |  | 4'd10 | 4'd10 |
|  |  | 4'd11 | 4'd11 |
|  |  | 4'd12 | 4'd12 |
|  |  | 4'd13 | 4'd13 |
|  |  | 4'd14 | 4'd14 |
|  |  | 4'd15 | 4'd15 |

| 0 | 1 | 2 | 3 |
|---|---|---|---|
| 4 | 5 | 6 | 7 |
| 8 | 9 | 10 | 11 |
| 12 | 13 | 14 | 15 |

# DATA PROCESSING APPARATUS, DATA PROCESSING METHOD AND DATA PROCESSING PROGRAM, ENCODING APPARATUS, ENCODING METHOD AND ENCODING PROGRAM, AND DECODING APPARATUS, DECODING METHOD AND DECODING PROGRAM

BACKGROUND OF THE INVENTION

1. Field of the Invention

The present invention relates to a data processing apparatus, a data processing method and a data processing program, an encoding apparatus, an encoding method and an encoding program, and a decoding apparatus, a decoding method and a decoding program, respectively suitable for use in a case where video data is compression encoded by using orthogonal encoding and motion compensation by intra-picture prediction code.

2. Description of Related Art

In the fields of both information distribution by a broadcast station and the like and information reception by ordinary homes, an encoding apparatus and a decoding apparatus for image information are prevailing nowadays, the image information being in conformity with a compression coding method stipulated in MPEG (Moving Pictures Expert Group). The compression coding method deals with image information such as moving images as digital data, and by utilizing redundancy specific to image information, performs compression coding using orthogonal transformation such as discrete cosine transform and prediction coding using motion compensation.

An MEPEG2 standard in particular (Moving Pictures Experts Group 2: ISO (International Organization for Standardization)/IEC (International Electrotechnical Commission) 13818-2) is defined as a general image coding method. The MPEG 2 standard covers all of picture data by interlace scanning and picture data by progressive scanning as well as standard resolution pictures and high definition pictures, and is now widely used for a variety of applications for professional use and consumer use.

A high compression factor and a good picture quality can be achieved by utilizing the compression coding method of the MPEG2 standard, for example, by assigning an interlace scanning picture having a standard resolution of 720×480 pixels with a code amount of 4 to 8 Mbps (Bit per Second) as a bit rate, and an interlace scanning picture having a high resolution of 1920×1088 pixels with a code amount of 18 to 22 Mbps as a bit rate.

While the MPEG2 standard aimed at high image quality coding adaptive mainly to broadcasting use, it is not compatible with a coding method for a smaller code amount (low bit rate), i.e., a higher compression factor. Wide spread of portable terminals have increased a demand for a coding method capable of achieving a high compression factor and a low bit rate. To respond the remand, an MPEG4 standard has been developed. A standard called ISO/IEC 14496-2 was approved in December 1998 as an international standard for an image coding method.

Recently, international standardization of a moving image coding method called H.26L is under progress. H.26L was initially devised aiming at image coding for a television conference, and its target is to achieve a compression performance about twice that of the existing coding standard such as MPEG4.

As a part of activities of MPEG4, standardization basing upon H.26L, incorporating functions not supported by H.26L and achieving a higher coding efficiency, progresses presently in the form of Joint Model of Enhanced-Compression Video Coding. In March 2003, a coding method of an international standard was stipulated in ITU-T (International Telecommunication Union-Telecommunication Standardization Sector) Recommendations H.264 or in ISO (International Organization for Standardization)/IEC (International Electrotechnical Commission) International Standard 14496-10 (MEPEG-4 part 10) Advanced Video Coding (hereinafter abbreviated to H.264|AVC). The content of processing on the basis of this stipulation is described in Non-Patent Document 1: "Draft Errata List with Revision-Marked Corrections for H.264/AVC", JVT-1050, Thomas Wiegand et al., Joint Video Team (JVT) of ISO/IEC MPEG & ITU-T VCEG, 2003.

Coding techniques in compliance with the H.264|AVC specifications are described Japanese Unexamined Patent Application Publication No. 2006-25033 (Patent Document 1).

One of the features of a coding method in compliance with the H.264|AVC specifications is that a motion vector of a processing object is predicted by further using motion vectors of a block which is adjacent to or contacts the processing object block, in addition to a known coding method such as MPEG2 standard for achieving inter-frame compression by prediction coding utilizing orthogonal transformation and motion compensation. With reference to FIGS. 20A and 20B, coding utilizing prediction motion vector will be described briefly.

Encoding utilizing a prediction motion vector is performed in the unit of a macro block having a predetermined size and divided from a picture plane. It is herein assumed that the size of one macro block is 16×16 pixels. Encoding utilizing a prediction motion vector is performed from the macro block at the upper left corner in the picture plane, from the left end to right end in the picture plane, and from the upper end to lower end in the picture plane. Namely, an encoding process has already been completed for macro blocks at upper positions and left positions relative to a macro block to be processed.

As illustratively shown in FIG. 20A, a prediction motion vector PMV (E) of a processing object macro block E is obtained from medians of each of horizontal and vertical components of motion vectors MV(A), MV(B) and MV(C) of the macro block A left adjacent to the macro block E, the macro block B upper adjacent, and the macro block C upper right adjacent, respectively.

SUMMARY OF THE INVENTION

According to the H.264|AVC specifications, the size of a motion prediction/compensation block is made variable. Namely, for the size of the motion prediction/compensation block, four types are defined including 16×16 pixels, 16×8 pixels, 8×16 pixels and 8×8 pixels as the size of the macro block unit, in addition, for the size of a submacro block unit of the 8×8 pixel block, four types are defined including 8×8 pixels, 8×4 pixels, 4×8 pixels and 4×4 pixels. Motion prediction/compensation blocks of these seven types are used by properly selecting. By selectively using most optimum motion prediction/compensation blocks of a plurality of types, finer motion prediction is possible while suppressing an amount of code to be formed.

For example, as illustratively shown in FIG. 20B, for the processing object macro block E, a submacro block of 8×4 pixels is used for the left adjacent macro block A, a submacro block of 4×8 pixels is used for the upper adjacent macro block B, and a submacro block of 16×8 pixels is used for the right upper adjacent macro block C.

As described above, since a plurality of motion prediction/compensation block sizes are defined, there exist a great number of combinations between the processing object macro block and the adjacent macro blocks and submacro blocks. Accordingly, in selecting the adjacent motion vectors MV(A), MV(B) and MV(C) when the prediction motion vector MV(E) of the processing object macro block E is obtained, there arises a problem that the calculation amount becomes enormous and a processing time is prolonged.

In order to shorten the processing time, there also arises a problem that a calculation circuit having a high processing ability is required with a possibility of resulting in a higher cost of the apparatus.

For example, the number of combinations of submacro blocks for a macro block having a size of 16×16 pixels is 256 as shown in FIGS. 21 to 24. Namely, submacro blocks have a structure of four hierarchical levels each having four branches, and are represented by parameters sub_mb_type0, sub_mb_type1, sub_mb_type2 and sub_mb_type3 having a data length of 4 bits, and a parameter mb_type having a data length of 6 bits and indicating an upper level macro block type.

FIG. 21 shows an example of a combination when the block size of an upper left corner submacro block type in a macro block is fixed to 8×8 pixels, FIG. 22 shows an example of a combination when the block size of an upper left corner submacro block type is fixed to 8×4 pixels, FIG. 23 shows an example of a combination when the block size of an upper left corner submacro block type is fixed to 4×8 pixels, and FIG. 24 shows an example of a combination when the block size of an upper left corner submacro block type is fixed to 4×4 pixels. One macro block has 259 combinations including 256 combinations plus 3 combinations corresponding to block types of the macro block types. Accordingly, combinations between the processing object block and adjacent blocks have $259^2=67081$ patterns, so that judgment of 67081 patterns are required to be fabricated.

Accordingly, it is desirable to a data processing apparatus, a data processing method and a data processing program, an encoding apparatus, an encoding method and an encoding program, and a decoding apparatus, a decoding method and a decoding program, respectively capable of reducing a calculation amount required to select motion prediction/compensation blocks when a motion vector of a processing object is to be predicted by using motion vectors of blocks which are adjacent to or contacts the processing target block.

In accordance with a first aspect of the present invention, there is provided a data processing apparatus including: a motion vector storage unit for storing a motion vector in a unit block area of a unit block, an index value generating unit, a storage control unit, and a motion vector reading unit. The unit block is defined by dividing one picture plane in a predetermined manner into macro blocks and further dividing each macro block in a predetermined manner. The unit block area is assigned an index value in a predetermined order in the macro block. The index value generating unit generates the index value corresponding to a position of the unit block at an upper left corner and an upper right corner of an object block for which a prediction motion vector is to be acquired, on the basis of a size of the object block capable of taking a plurality of difference sizes. The storage control unit copies a motion vector of an adjacent block by each of the unit block area of the motion vector storage unit and stores the copied motion vector. The unit block area corresponds to the adjacent block of the motion vector storage unit. The adjacent block exists in a same two-dimensional picture area as the object block, contacts the object block at left side, upper side, upper right, or upper left and is capable of taking a plurality of different sizes. The motion vector reading unit obtains the index value indicating the unit block area of the motion vector storage unit from which the motion vector is to be read, on the basis of the index value generated by the index value generating unit. The prediction motion vector is obtained on the basis of the motion vector read by the motion vector reading unit.

In accordance with a second aspect of the present invention, there is provided a data processing method including the steps of: storing a motion vector in a unit block area of a unit block, generating an index value, copying a motion vector of an adjacent block by each of the unit block area of the motion vector storage unit and storing the copied motion vector, reading a motion vector for obtaining the index value, and obtaining a prediction motion vector on the basis of the motion vector read by the motion vector reading step. The unit block is defined by dividing one picture plane in a predetermined manner into macro blocks and further dividing each macro block in a predetermined manner. The unit block area is provided in the motion vector storage unit and is assigned the index value in a predetermined order in the macro block. The index value corresponds to a position of the unit block at an upper left corner and an upper right corner of an object block for which a prediction motion vector is to be acquired, on the basis of a size of the object block capable of taking a plurality of difference sizes. The unit block area corresponds to the adjacent block of the motion vector storage unit. The adjacent block exists in a same two-dimensional picture area as the object block, contacts the object block at left side, upper side, upper right, or upper left and is capable of taking a plurality of different sizes. The index value indicates the unit block area of the motion vector storage unit from which the motion vector is to be read, on the basis of the index value generated by the index value generating step.

In accordance with a third aspect of the present invention, there is provided a data processing program for making a computer execute a data processing method, the data processing method including the steps of: storing a motion vector in a unit block area of a unit block, generating an index value, copying a motion vector of an adjacent block by each of the unit block area of the motion vector storage unit and storing the copied motion vector, reading a motion vector for obtaining the index value, and obtaining a prediction motion vector on the basis of the motion vector read by the motion vector reading step. The unit block is defined by dividing one picture plane in a predetermined manner into macro blocks and further dividing each macro block in a predetermined manner. The unit block area is provided in the motion vector storage unit and is assigned the index value in a predetermined order in the macro block. The index value corresponds to a position of the unit block at an upper left corner and an upper right corner of an object block for which a prediction motion vector is to be acquired, on the basis of a size of the object block capable of taking a plurality of difference sizes. The unit block area corresponds to the adjacent block of the motion vector storage unit. The adjacent block exists in a same two-dimensional picture area as the object block, contacts the object block at left side, upper side, upper right, or upper left and is capable of taking a plurality of different sizes. The index value indicates the unit block area of the motion vector storage unit from which the motion vector is to be read, on the basis of the index value generated by the index value generating step.

In accordance with a four aspect of the present invention, there is provided an encoding apparatus for encoding moving picture data, including a motion vector storage unit for storing a motion vector in a unit block area of a unit block, an index value generating unit, a storage control unit, and a motion vector reading unit. The unit block is defined by dividing one picture plane in a predetermined manner into macro blocks and further dividing each macro block in a predetermined manner. The unit block area is assigned an index value in a predetermined order in the macro block. The index value generating unit generates the index value corresponding to a position of the unit block at an upper left corner and an upper right corner of an object block for which a prediction motion vector is to be acquired, on the basis of a size of the object block capable of taking a plurality of difference sizes. The storage control unit copies a motion vector of an adjacent block by each of the unit block area of the motion vector storage unit and stores the copied motion vector. The unit block area corresponds to the adjacent block of the motion vector storage unit. The adjacent block exists in a same two-dimensional picture area as the object block, contacts the object block at left side, upper side, upper right, or upper left and is capable of taking a plurality of different sizes. The motion vector reading unit obtains the index value indicating the unit block area of the motion vector storage unit from which the motion vector is to be read, on the basis of the index value generated by the index value generating unit. The prediction motion vector is generated on the basis of the motion vector read by the motion vector reading unit, prediction picture data is generated on the basis of the motion vector obtained for each block. A difference between the prediction picture data and input picture data is encoded.

In accordance with a fifth aspect of the present invention, there is provided an encoding method for encoding moving picture data, including the steps of: storing a motion vector in a unit block area of a unit block, generating an index value, copying a motion vector of an adjacent block by each of the unit block area and storing the copied motion vector, reading the motion vector for obtaining the index value, obtaining a prediction motion vector on the basis of the motion vector read by the motion vector step. The unit block is defined by dividing one picture plane in a predetermined manner into macro blocks and further dividing each macro block in a predetermined manner. The unit block area is provided in the motion vector storage unit and is assigned an index value in a predetermined order in the macro block. The index value corresponds to a position of the unit block at an upper left corner and an upper right corner of an object block for which a prediction motion vector is to be acquired, on the basis of a size of the object block capable of taking a plurality of difference sizes. The unit block area corresponds to the adjacent block of the motion vector storage unit. The adjacent block exists in a same two-dimensional picture area as the object block, contacts the object block at left side, upper side, upper right, or upper left and being capable of taking a plurality of different sizes. The index value indicating the unit block area of the motion vector storage unit from which the motion vector is to be read, is generated on the basis of the index value generated by the index value generating unit. The prediction motion vector is generated on the basis of the motion vector read by the motion vector reading step, and prediction picture data is generated on the basis of the motion vector obtained for each block. A difference between the prediction picture data and input picture data is encoded.

In accordance with a sixth aspect of the present invention, there is provided an encoding program for making a computer execute an encoding method of encoding moving picture data, including the steps of: storing a motion vector in a unit block area of a unit block, the unit block being defined by dividing one picture plane in a predetermined manner into macro blocks and further dividing each macro block in a predetermined manner, and the unit block area being provided in a motion vector storage unit and being assigned an index value in a predetermined order in the macro block;

generating the index value corresponding to a position of the unit block at an upper left corner and an upper right corner of an object block for which a prediction motion vector is to be acquired, on the basis of a size of the object block capable of taking a plurality of difference sizes;

copying a motion vector of an adjacent block by each of the unit block area of the motion vector storage unit and storing the copied motion vector, the unit block area corresponding to the adjacent block of the motion vector storage unit, the adjacent block existing in a same two-dimensional picture area as the object block, contacting the object block at left side, upper side, upper right, or upper left and being capable of taking a plurality of different sizes;

reading the motion vector for obtaining the index value indicating the unit block area of the motion vector storage unit from which the motion vector is to be read, on the basis of the index value generated by the index value generating unit; and obtaining the prediction motion vector on the basis of the motion vector read by the motion vector reading step, wherein the prediction motion vector is generated on the basis of the motion vector read by the motion vector reading step, prediction picture data is generated on the basis of the motion vector obtained for each block, and a difference between the prediction picture data and input picture data is encoded.

In accordance with a seventh aspect of the present invention, there is provided a decoding apparatus for decoding encoded picture data obtained by encoding a difference between prediction picture data generated on the basis of a motion vector obtained for each block and prediction picture data generated on the basis of prediction motion vector obtained by using the motion vector and input picture data, including: a motion vector storage unit for storing a motion vector in a unit block area of a unit block, the unit block being defined by dividing one picture plane in a predetermined manner into macro blocks and further dividing each macro block in a predetermined manner, and the unit block area being assigned an index value in a predetermined order in the macro block;

an index value generating unit for generating the index value corresponding to a position of the unit block at an upper left corner and an upper right corner of an object block for which a prediction motion vector is to be acquired, on the basis of a size of the object block capable of taking a plurality of difference sizes;

a storage control unit for copying a motion vector of an adjacent block by each of the unit block area of the motion vector storage unit and storing the motion vector, the unit block area corresponding to the adjacent block of the motion vector storage unit, the adjacent block existing in a same two-dimensional picture area as the object block, contacting the object block at left side, upper side, upper right, or upper left and being capable of taking a plurality of different sizes; and a motion vector reading unit for obtaining the index value indicating the unit block area of the motion vector storage unit from which the motion vector is to be read, on the basis of the index value generated by the index value generating unit, wherein the prediction picture data is generated on the basis of the prediction motion vector and the motion vector obtained for each block, the motion vector being obtained using the motion vector read by the motion vector reading unit, and a decoding process is performed by an addition of the prediction picture data and a coded picture data inputted.

In accordance with an eighth aspect of the present invention, there is provided a decoding method for decoding encoded picture data obtained by encoding a difference between prediction picture data generated on the basis of a motion vector obtained for each block and prediction picture data generated on the basis of prediction motion vector obtained by using the motion vector and input picture data, including the steps of: storing a motion vector in a unit block area of a unit block, the unit block being defined by dividing one picture plane in a predetermined manner into macro blocks and further dividing each macro block in a predetermined manner, and the unit block area being provided in a motion vector storage unit and being assigned an index value in a predetermined order in the macro block;

generating the index value corresponding to a position of the unit block at an upper left corner and an upper right corner of an object block for which a prediction motion vector is to be acquired, on the basis of a size of the object block capable of taking a plurality of difference sizes;

copying a motion vector of an adjacent block by each of the unit block area of the motion vector storage unit and storing the copied motion vector, the unit block area corresponding to the adjacent block of the motion vector storage unit, the adjacent block existing in a same two-dimensional picture area as the object block, contacting the object block at left side, upper side, upper right, or upper left and being capable of taking a plurality of different sizes;

reading the motion vector for obtaining the index value indicating the unit block area of the motion vector storage unit from which the motion vector is to be read, on the basis of the index value generated by the index value generating unit; and obtaining the prediction motion vector on the basis of the motion vector read by the motion vector reading step, wherein prediction picture data is generated on the basis of the prediction motion vector and a motion vector obtained for each block, the prediction motion vector being generated on the basis of the motion vector read by the motion vector reading step, and a decoding process is performed by an addition of the prediction picture data and picture data inputted.

In accordance with a ninth aspect of the present invention, there is provided a decoding program for making a computer execute a decoding method for decoding encoded picture data obtained by encoding a difference between prediction picture data generated on the basis of a motion vector obtained for each block and prediction picture data generated on the basis of prediction motion vector obtained by using the motion vector and input picture data, the decoding method including the steps of: storing a motion vector in a unit block area of a unit block, the unit block being defined by dividing one picture plane in a predetermined manner into macro blocks and further dividing each macro block in a predetermined manner, and the unit block area being provided in a motion vector storage unit and being assigned an index value in a predetermined order in the macro block;

generating the index value corresponding to a position of the unit block at an upper left corner and an upper right corner of an object block for which a prediction motion vector is to be acquired, on the basis of a size of the object block capable of taking a plurality of difference sizes;

copying a motion vector of an adjacent block by each of the unit block area of the motion vector storage unit and storing the copied motion vector, the unit block area corresponding to the adjacent block of the motion vector storage unit, the adjacent block existing in a same two-dimensional picture area as the object block, contacting the object block at left side, upper side, upper right, or upper left and being capable of taking a plurality of different sizes;

reading the motion vector for obtaining the index value indicating the unit block area of the motion vector storage unit from which the motion vector is to be read, on the basis of the index value generated by the index value generating unit; and obtaining the prediction motion vector on the basis of the motion vector read by the motion vector reading step, wherein prediction picture data is generated on the basis of the prediction motion vector and a motion vector obtained for each block, the prediction motion vector being generated on the basis of the motion vector read by the motion vector reading step, and a decoding process is performed by an addition of the prediction picture data and picture data inputted.

As described above, according to the first to third aspect of the present inventions, for the motion vector storage unit for storing a motion vector in a unit block area of a unit block, the unit block being defined by dividing one picture plane in a predetermined manner into macro blocks and further dividing each macro block in a predetermined manner, and the unit block being provided in the motion vector storage unit and being assigned an index value in the macro block in a predetermined order; a motion vector is stored in the unit block area, the motion vectors of left, upper and upper right or upper left adjacent blocks contacting the processing object block, existing in the same two-dimensional picture area as the processing object block, and being capable of having a plurality of different sizes are copied and stored in the unit block areas corresponding to the adjacent blocks in the motion vector storage unit, the index values corresponding the positions of the upper left corner and upper right corner of the processing object block for which the prediction vector is to be obtained are generated on the basis of the size of the processing object block capable of having a plurality of different sizes, the index value indicating the unit block area in the motion vector storage unit from which the motion vector is to be read is obtained, on the basis of the generated index values, and the prediction motion vector is obtained on the basis of the motion vector read from the motion vector storage unit on the basis of the index value. Accordingly, when the motion vector to be used for obtaining the prediction motion vector from the motion vector storage unit, it is unnecessary to consider the size of the corresponding adjacent block.

Further, according to the fourth to sixth aspect of the present inventions, in encoding a moving picture plane, for the motion vector storage unit for storing a motion vector in a unit block area of a unit block, the unit block being defined by dividing one picture plane in a predetermined manner into macro blocks and further dividing each macro block in a predetermined manner, and the unit block being provided in the motion vector storage unit and being assigned an index value in the macro block in a predetermined order; a motion vector is stored in the unit block area, the motion vectors of left, upper and upper right or upper left adjacent blocks contacting the processing object block, existing in the same two-dimensional picture area as the processing object block, and being capable of having a plurality of different sizes are copied and stored in the unit block areas corresponding to the adjacent blocks in the motion vector storage unit, the index values corresponding the positions of the upper left corner and upper right corner of the processing object block for which the prediction vector is to be obtained are generated on the basis of the size of the processing object block capable of having a plurality of different sizes, the index value indicating the unit block area in the motion vector storage unit from which the motion vector is to be read is obtained, on the basis of the generated index values, the prediction motion vector is obtained on the basis of the motion vector read from the motion vector storage unit on the basis of the index value, prediction vector data is generated on the basis of the prediction motion vector obtained by using the motion vector read in the motion vector read step and the motion vectors obtained for each block, and a difference between the prediction picture data and the input picture data is encoded. Accordingly, when the motion vector to be used for obtaining the prediction motion vector from the motion vector storage unit, it is unnecessary to consider the size of the corresponding adjacent block.

Furthermore, according to the seventh to ninth aspect of the present inventions, in decoding the encoded picture data obtained by encoding a difference between the prediction picture data obtained by encoding a difference between the motion vectors of each block and the prediction motion vector obtained by using the motion vectors, for the motion vector storage unit for storing a motion vector in a unit block area of a unit block, the unit block being defined by dividing one picture plane in a predetermined manner into macro blocks and further dividing each macro block in a predetermined manner, and the unit block being provided in the motion vector storage unit and being assigned an index value in the macro block in a predetermined order; a motion vector is stored in the unit block area, the motion vectors of left, upper and upper right or upper left adjacent blocks contacting the processing object block, existing in the same two-dimensional picture area as the processing object block, and being capable of having a plurality of different sizes are copied and stored in the unit block areas corresponding to the adjacent blocks in the motion vector storage unit, the index values corresponding the positions of the upper left corner and upper right corner of the processing object block for which the prediction vector is to be obtained are generated on the basis of the size of the processing object block capable of having a plurality of different sizes, the index value indicating the unit block area in the motion vector storage unit from which the motion vector is to be read is obtained, on the basis of the generated index values, the prediction motion vector is obtained on the basis of the motion vector read from the motion vector storage unit on the basis of the index value, prediction vector data is generated on the basis of the prediction motion vector obtained by using the motion vector read in the motion vector read step and the motion vectors obtained for each block, and an addition of the prediction picture data and the input picture data is decoded. Accordingly, when the motion vector to be used for obtaining the prediction motion vector from the motion vector storage unit, it is unnecessary to consider the size of the corresponding adjacent block.

The above summary of the present invention is not intended to describe each illustrated embodiment or every implementation of the present invention. The figures and the detailed description which follow more particularly exemplify these embodiments.

BRIEF DESCRIPTION OF THE DRAWINGS

FIG. 7 is a schematic diagram showing an example of a table showing the index values lft_idx[3:0] and rht_idx[3:0] related to the macro block and submacro block.

FIG. 8 is a schematic diagram showing positions of the rightmost and leftmost unit blocks of a motion compensation block on the macro block, and the corresponding index values lft_idx[3:0] and rht_idx[3:0].

FIG. 10 is a schematic diagram showing each index value assigned in a raster scan order to each area corresponding to a unit block.

DETAILED DESCRIPTION OF EMBODIMENTS

Figure 1:
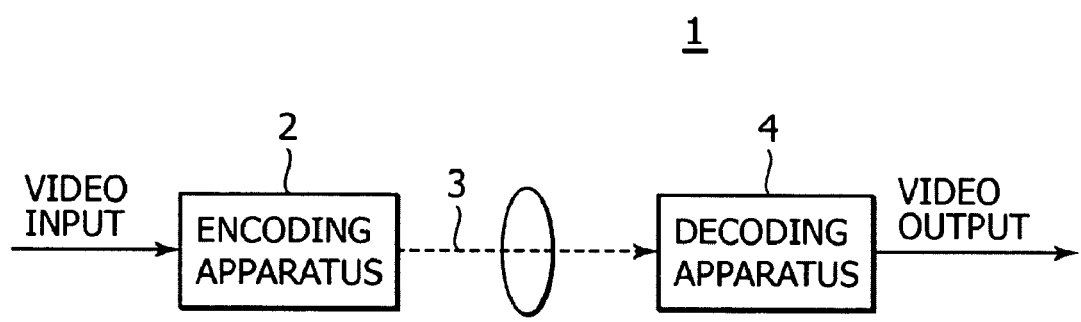
FIG. 1 is a block diagram schematically showing an example of an encoding/decoding system to which the present invention is applied.

Embodiments of the present invention will be described with reference to the accompanying drawings. FIG. 1 is a schematic diagram showing an example of an encoding/decoding system 1 to which the present invention is applied. The encoding/decoding system 1 includes an encoding apparatus 2 on a transmission side and a decoding apparatus 4 on a reception side, the encoding apparatus 2, and decoding apparatus 4. The encoding apparatus 2 and the decoding apparatus 4 are interconnected through a transmission line 3.

The encoding apparatus 2 performs compression encoding of picture data of an input video signal, by orthogonal transformation such as discrete cosine transform, intra-picture-plane prediction encoding and intra-frame prediction encoding. In intra-frame prediction encoding, a frame picture includes, for example, an I (Intra-coded) picture based on intra-frame encoding, a P (Predictive-coded) picture based on prediction encoding, and a B (Bi-directionally predictive coded) picture. A frame picture is encoded as data having a GOP (Group Of Pictures) structure disposing the I picture, P picture and B picture in a predetermined arrangement. The encoding apparatus 2 outputs the compression encoded frame picture data as a bit stream.

The bit stream is transmitted to the decoding apparatus 4 via the transmission line 3. The transmission line 3 may be a communication network such as a broadband satellite wave, a CATV (Cable Television) network, a telephone line network, and a mobile phone network. As the transmission line 3, a storage or record medium may be used such as an optical disc, a magnetic disk, a magnetic tape, and a semiconductor memory. The decoding apparatus 4 performs a decoding process corresponding to the encoding process by the encoding apparatus, for the bit stream transmitted via the transmission line 3 to expand the compression encoded frame picture data, and outputs a video signal of a base band.

Figure 2:
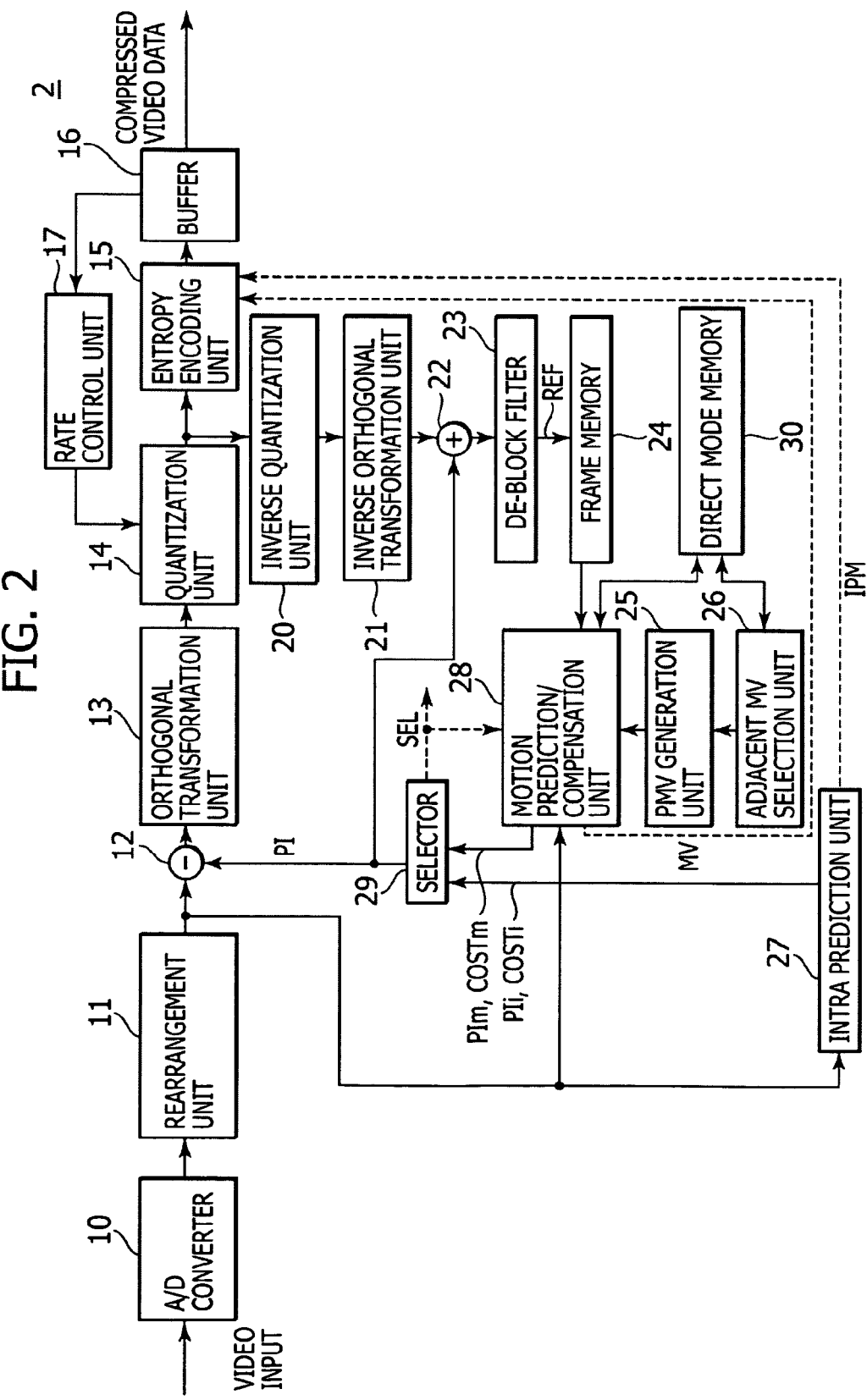
FIG. 2 is a block diagram showing an example of an encoding apparatus applied to an embodiment.

FIG. 2 shows an example of the structure of the encoding apparatus 2 applied to the embodiment. For example, a video signal of an original picture of an analog type composed of a luminance signal Y and color difference signals Cb and Cr is supplied to an A/D converter unit 10 which converts the analog video signal into picture data of a digital video signal and outputs the picture data. A rearrangement unit 11 rearranges frame picture signals in the picture data outputted from the A/D converter unit 10 in an encoding order, in accordance with, e.g., the GOP structure composed of the I picture, P picture, and B picture. The picture data of the original picture with the rearranged frame order is inputted to one input terminal of a subtractor unit 12, a motion prediction/compensation unit 28, and an intra prediction unit 27.

The prediction picture data PI outputted from a selector unit 29 described later is inputted to the other terminal of the subtractor unit 12. The subtractor unit 12 subtracts the prediction picture data PI inputted to the other terminal from the picture data of the original picture inputted to one terminal, and outputs difference picture data representative of a difference between the picture data of the original picture and the prediction picture data PI. The difference picture data is supplied to an orthogonal transformation unit 13.

The orthogonal transformation unit 13 performs orthogonal transformation of the supplied difference picture data to generate coefficient data. It is considered herein that, for example, discrete cosine transform (DCT: Discrete Cosine Transform) is used as the orthogonal transformation by the orthogonal transformation unit 13. The coefficient data generated by the orthogonal transformation unit 13 is supplied to a quantization unit 14. The quantization unit 14 quantizes the coefficient data based on a quantizing scale supplied from a rate control unit 17 described later, and outputs the quantized data obtained by quantizing the coefficient data.

An orthogonal transformation process by the orthogonal transformation unit 13 and a quantizing process by the quantization unit 14 are performed in a predetermined block unit. For example, one frame is divided in a predetermined manner to form orthogonal transformation blocks each used as a unit for the orthogonal transformation process, and a macro block composed of a plurality of orthogonal transformation blocks is used as a unit for the quantizing process. For example, the orthogonal transformation block is a square block made of 8×8 pixels, and the macro block is a square block constituted of four orthogonal transformation blocks.

The quantized data outputted from the quantization unit 14 is supplied to an entropy encoding unit 15 and an inverse quantization unit 20, respectively.

The entropy encoding unit 15 performs an entropy encoding process such as a variable length encoding process or an arithmetic encoding process to the supplied quantized data, whereby the quantized data is further compression-encoded. In this case, the entropy encoding unit 15 encodes a motion vector MV supplied from the motion prediction/compensation unit 28 described later or a difference motion vector of the motion vector MV, identification data of a reference picture data to be referred to by prediction encoding, and an intra prediction mode IPM supplied from the intra prediction unit 27, and stores the result in a header or the like of the encoded quantized data in a predetermined manner.

The encoded data outputted from the entropy encoding unit 15 is used as the final compressed picture data of the encoding apparatus 2. The compressed picture data outputted from the entropy encoding unit 15 is stored in a buffer 16. The above-described rate control unit 17 monitors the compressed picture data stored in the buffer 16, determines the quantizing scale based on the monitored result, and supplies the quantizing scale to the quantization unit 14. The compressed picture data stored in the buffer 16 is read in a predetermined manner, processed by a process such as a modulation process necessary for transmission to the transmission line 3, and outputted from the encoding apparatus 2.

The inverse quantization unit 20 performs an inverse process of the process by the quantization unit 14, to the quantized data supplied from the quantization unit 14, to thereby generate inversely quantized data. The inversely quantized data is supplied to an inverse orthogonal transformation unit 21 to be subject to an inverse transformation process of the orthogonal transformation by the above-described orthogonal transformation unit 13. The inversely transformed picture data outputted from the inverse orthogonal transformation unit 21 is inputted to one input terminal of an adder 22.

The adder 22 adds the inversely converted picture data inputted to one input terminal and prediction picture data PI outputted from the selector unit 29 described later and inputted to the other input terminal to generate reconfiguration picture data. The reconfiguration picture data is supplied to a de-block filter 23 to remove block strain, and written in a frame memory 24 as reference picture data REF.

The frame memory 24 is sequentially written with the reconfiguration picture data of each picture as an object of the motion prediction/compensation process by the motion prediction/compensation unit 28 described later and the intra prediction process by the intra prediction unit 27, in the unit of the macro block completed processing.

The motion prediction/compensation unit 28 detects a motion vector MV from the reference picture data REF stored in the frame memory 24 and picture data of the original picture supplied from the picture rearrangement unit 11, on the basis of a motion prediction/compensation block size finally selected in accordance with the prediction motion vector PMV supplied from a PMV generating unit 25. The motion prediction/compensation unit 28 generates prediction picture data PIm on the basis of the reference picture data REF stored in the frame memory 24 and the motion vector MV, and obtains index data COSTm used as an index of a code amount of encoded data. The prediction picture data PIm and index data COSTm are inputted to one input terminal of the selector unit 29.

Figure 3:
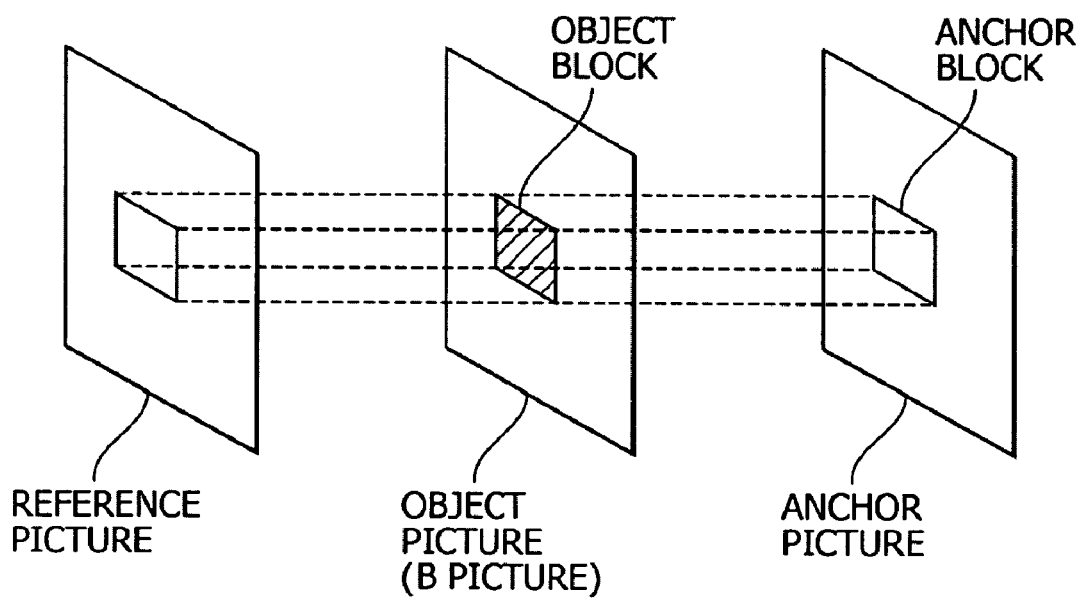
FIG. 3 is a schematic diagram explaining a direct mode.

The motion prediction/compensation unit 28 can perform prediction encoding with respect to a frame whose picture type is the B picture, in a direct mode. The direct mode is a mode of predicting the motion vector MV from the already encoded blocks, and includes a time direct mode and a space direct mode. In the direct mode, as illustratively shown in FIG. 3, a motion vector of a corresponding block of an object picture is predicted from motion vectors of corresponding pictures before and after the object picture in a time domain. For example, a reference picture immediately after the object picture is used as an anchor picture, and prediction uses the anchor picture and a reference picture of the anchor picture at a position where the object picture is sandwiched between the reference picture and anchor picture.

As described above, since the motion vector is predicted from the already encoded blocks in the direct mode, it is necessary to store all motion vectors of predetermined pictures. In the example shown in FIG. 2, the generated motion vector is stored in a direct mode memory 30. In this case, there may be a case in which the sizes of motion compensation blocks are all 4×4 pixels in the macro block in a predetermined picture. It is therefore necessary for the direct mode memory 30 to have a capacity capable of storing motion vectors having a possibility of being detected in a block of 4×4 pixels, in amount of one frame of 16 blocks per one macro block.

On the basis of a select signal SEL supplied from the selector unit 29 described later, the motion prediction/compensation unit 28 stores the above-described motion vector MV in the direct mode memory 30. It is therefore unnecessary to provide another memory for storing the motion vector in each unit block, and an increase in the circuit scale does not occur. It is obvious that the embodiment is not limited thereto, but another memory may be used for storing the motion vector.

The motion prediction/compensation unit 28 supplies the detected motion vector MV to the entropy encoding unit 15. The motion prediction/compensation unit 28 also supplies the entropy encoding unit 15 with the information on the size of the finally selected motion prediction/compensation block, the motion prediction/compensation mode MEM representative of the reference picture data REF and the identification data of the reference picture data selected by the motion prediction/compensation process. The entropy encoding unit 15 encodes the supplied information after storing the information in a predetermined position such as a header or the like.

If the macro block to be processed in picture data of the original picture is to be inter (inter-picture-planes) encoded, the PMV generating unit 25 generates a prediction motion vector PMV on the basis of the motion vector of the block selected by an adjacent MV selector unit 26, the motion vector having been already generated with reference to nearby block data of each macro block having a plurality of motion prediction/compensation sizes defined by each macro block.

Processes in the PMV generating unit 25 and adjacent MO selector unit 26 will be briefly described. A motion vector MV of each block outputted from the motion prediction/compensation unit 28 is supplied to the adjacent MV selector unit 26. In this example, the adjacent MV selector unit 26 reads the motion vector MV from the direct mode memory 30.

Figure 4A:
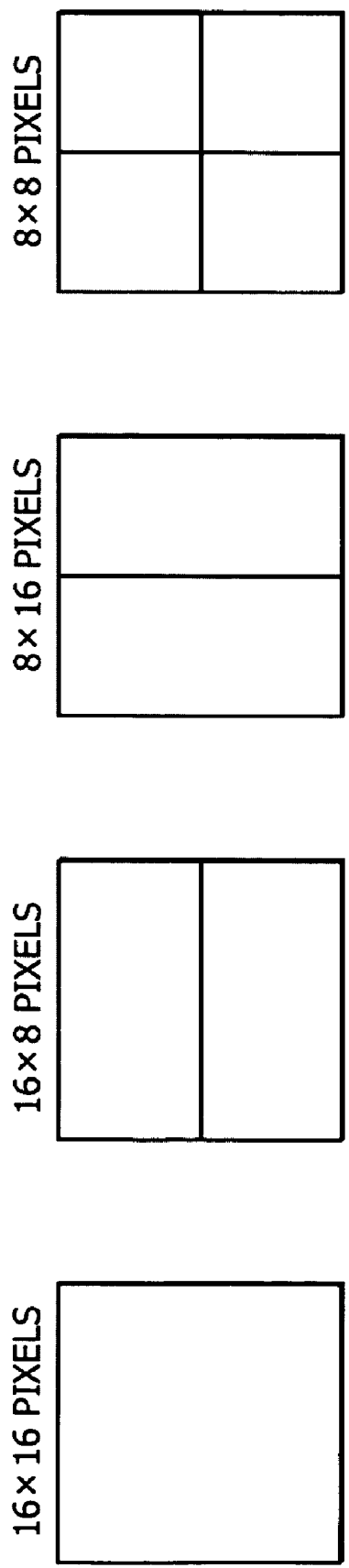
FIGS. 4A and 4B are schematic diagrams showing a plurality of block sizes defined for a motion prediction/compensation block.
Figure 4B:

In this embodiment, as illustratively shown in FIGS. 4A and 4B, defined as the block sizes of the motion prediction/compensation block are four types (called macro block types) of macro block unit sizes including 16×16 pixels, 16×8 pixels, 8×16 pixels, and 8×8 pixels (refer to FIG. 4A), and four types (called submacro block types) of submacro block unit sizes in the 8×8 pixels block including 8×8 pixels, 8×4 pixels, 4×8 pixels, and 4×5 pixels (refer to FIG. 4B).

The adjacent MV selector unit 26 selects a predetermined block whose motion vector MV is to be generated prior to generating a motion vector of a processing object macro block, for data of a plurality of blocks positioned near the processing object macro block (i.e., data of blocks positioned near the processing object macro block in a two-dimensional picture plane area). The adjacent MV selector unit 26 supplies a motion vector MV of the selected block to the PMV generating unit 25.

In an embodiment of the present invention, a block selecting process in the adjacent MV selector unit 26 is devised so that a process of selecting a predetermined block from adjacent blocks near the processing object macro block (macro block to be processed) is facilitated.

The PMV generating unit 25 obtains a prediction motion vector PMV of the processing object block on the basis of the motion vector MV supplied from the adjacent MV selector unit 26. For example, the PMV generating unit 25 extracts medians of motion vectors of, e.g., upper and left adjacent blocks to the processing object block and an upper right adjacent block, and uses the medians as the prediction motion vector of the processing object block. The median is a median value of a plurality of object values.

The PMV generating unit 25 generates the prediction motion vector PMV independently for vertical and horizontal directions. There is therefore a case in which the vertical components of the motion vector MV of the left adjacent block to the processing object block may become the vertical components of the prediction motion vector and the horizontal components of the motion vector MV of the upper right adjacent block may become the horizontal components of the prediction motion vector PMV.

If all blocks to be positioned near the blocks to be processed do not exist near the processing object block, i.e., do not exist at positions adjacent to or contacting in the two-dimensional picture plane area, the PMV generating unit 25 sets the value of the prediction motion vector PMV of the block to 0. If the blocks to be positioned to upper adjacent block to be processed does not exist near the processing object block, i.e., does not exist in the two-dimensional picture plane area, the motion vector MV of the left adjacent block to the processing object block is used as the prediction motion vector PMV. If the block to be positioned upper right block to be processed does not exist in the two-dimensional picture plane area, the motion vector MV is obtained by using the motion vector MV of the blocks positioned in the upper left adjacent block to be processed instead of the motion vector of the upper right block.

In the following, with respect to the processing object macro block (called "macro block E" where appropriate), the left adjacent block is called a block A, the upper adjacent block is called a block B, the upper right adjacent block is called a block C, and the upper left adjacent block is called a block D.

The intra prediction unit 27 performs intra (intra-picture-plane) prediction encoding to picture data of the original picture supplied from the picture rearrangement unit 11. In this case, the intra prediction unit 27 generates prediction picture data PIi of the processing object macro block for each of a plurality of modes such as an intra 4×4 mode for performing intra-picture-plane prediction encoding in the unit of 4×4 pixels or an intra 16×16 mode for performing intra-picture-plane prediction encoding in the unit of 16×16, and generates the index data COSTi as an index of the amount of encoded data, on the basis of the prediction picture data PIi and the picture data of the original picture supplied from the rearrangement unit 11. The intra prediction unit 27 selects an intra prediction mode minimizing the generated index data COSTi. The intra prediction unit 27 supplies the selector unit 29 with the prediction picture data PIi and index data COSTi generated in correspondence with the finally selected intra prediction mode.

When the intra prediction unit 27 is notified of a selection of the intra prediction mode by the select signal SEL supplied from the selector unit 29, the intra prediction unit supplies prediction mode information IPM showing the finally selected intra prediction mode to the entropy encoding unit 15. The entropy encoding unit 15 encodes the supplied prediction mode information IPM after storing the information in a header or the like.

The selector unit 29 compares the index data COSTi supplied from the motion prediction/compensation unit 28 with index data COSTm supplied from the intra prediction unit 27, identifies a smaller value, and selects and outputs the prediction picture data PIi or prediction picture data PIm input in correspondence with the identified index data. The prediction picture data PIi or prediction picture data PIm outputted from the selector unit 29 is inputted to the other input terminal of the subtractor unit 13.

If the selector unit 29 judges from the comparison result between the index data COSTi and index data COSTm that the index data COSTi is smaller, the selector unit outputs a select signal indicating that the intra prediction mode is selected. On the other hand, if the selector unit 29 judges from the comparison result that the index data COSTm is smaller, the selector unit outputs a select signal indicating that the motion prediction/compensation mode is selected. The select signal SEL is supplied to the intra prediction unit 27 and motion prediction/comparison unit 28.

H.264|AVC defines as an encoding unit a slice consecutively coupling macro blocks in a horizontal direction. Therefore, slices of different types including an I slice, a P slice, and a B slice can be mixed in one picture. The I slice is a slice used only for intra-picture plane (intra) encoding. The B slice is a slice used for intra-picture encoding and inter-frame prediction encoding using one or two reference pictures. The P slice is a slice used for intra-picture encoding and inter-frame prediction encoding using one reference picture. In H.264|AVC, the intra prediction unit 27 may perform intra prediction encoding even for a macro block belonging to the P or B slice used for inter-frame prediction encoding using the reference picture.

Figure 5:
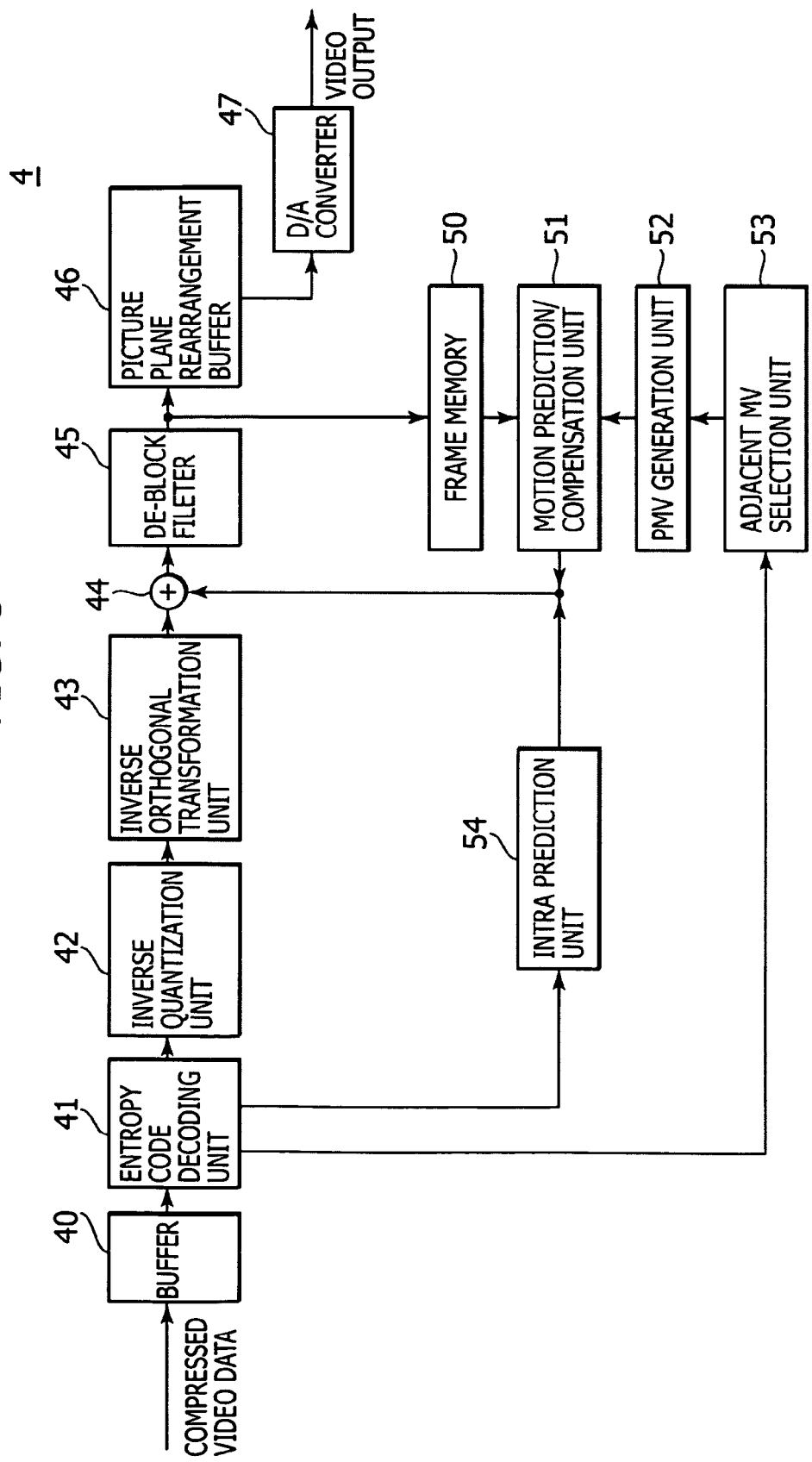
FIG. 5 is a block diagram showing an example of a decoding apparatus applied to an embodiment.

Next, the decoding apparatus 4 will be described. FIG. 5 shows an example of the structure of the decoding apparatus 4 applied to an embodiment of the present invention. The decoding apparatus 4 includes a buffer 40, an entropy code decoding unit 41, an inverse quantization unit 42, an inverse orthogonal transformation unit 43, an adder unit 44, a de-block filer 45, a picture plane rearrangement unit 46, a D/A converter 47, a frame memory 50, a motion prediction/compensation unit 51, an intra prediction unit 54, a PMV generating unit 52 and an adjacent MV selector unit 53.

A bit stream composed of frame pictures compression encoded by the encoding apparatus 2 in the manner described above is inputted to the decoding apparatus 4 via the transmission line 3. The inputted bit stream is once loaded in the buffer 40. The bit stream read from the buffer 40 is supplied to the entropy code decoding unit 41.

The entropy code decoding unit 41 performs a decoding process of entropy code, the decoding process corresponding to the entropy coding performed by the entropy encoding unit 15 of the encoding apparatus 2 described using FIG. 2. Data obtained by decoding entropy code is supplied to the inverse quantization unit 42. If the decoded frame picture data is the intra-encoded data, the entropy code decoding unit 41 supplies the frame picture data to the intra prediction unit 54.

The entropy code decoding unit 41 also decodes each piece of information stored in the header. If the decoded frame picture data is the intra-encoded data, the entropy code decoding unit 41 also decodes the prediction mode information IPM indicating the intra prediction mode stored in the header or motion vector MV, or a difference motion vector of the motion vector MV. The decoded prediction mode information IPM is supplied to the intra prediction unit 54 described later. The decoded motion vector MV or difference motion vector is supplied to the adjacent MV selector unit 53 described later.

The inverse quantization unit 42 performs an inverse process of the process in the quantization unit 15 (refer to FIG. 2) of the above-described encoding apparatus 2 with respect to the data supplied from the entropy code decoding unit 41, to generate inversely quantized data. The inversely quantized data is supplied to the inverse orthogonal transformation unit 43. The inverse orthogonal transformation unit 43 generates data (herein called "inverse conversion picture data") obtained by performing an inverse conversion process of orthogonal transformation in the orthogonal transformation unit 13 (refer to FIG. 2) of the above-described encoding apparatus 2, with respect to the data supplied from the inverse quantization unit 42. The inverse conversion picture data is inputted to one input terminal of the adder unit 44.

If the frame to be processed is an intra-encoded frame, the intra prediction unit 54 performs a decoding process to generate prediction picture data, by using the intra-encoded frame picture data supplied from the entropy code decoding unit 41 and the prediction mode information IPM. The prediction picture data is inputted to the other input terminal of the adder unit 44 to be synthesized with the inverse conversion picture data.

If the processing object frame is an inter-encoded frame, the reference picture data outputted from the motion prediction/compensation unit 51 is inputted to the other input terminal of the adder unit 44 to be synthesized with the inverse conversion picture data.

For example, approximately similar to the above-described encoding apparatus 2, if the inter-encoded data is to be processed, the adjacent MV selector unit 53 selects a predetermined block from blocks positioned surrounding the macro block to be processed on the basis of the motion vector MV supplied from the entropy code decoding unit 41. The motion vector of the selected block is selected from the motion vectors MV supplied from the entropy code decoding unit 41, and supplied to the PMV generating unit 52. The PMV generating unit 52 obtains the prediction motion vector PMV on the basis of the supplied motion vector MV. The motion prediction/compensation unit 51 generates reference picture data on the basis of the supplied prediction motion vector PMV and the frame picture data stored in the frame memory 50.

In the above description, although each component of the encoding apparatus 2 shown in FIG. 2 and the decoding apparatus 4 shown in FIG. 5 is composed of hardware, the embodiment is not limited thereto. For example, a portion or the entirety of the encoding apparatus 2 and decoding apparatus 4 may be implemented via software. For example, a program for running the encoding apparatus 2 and decoding apparatus 4 is supplied to a computer such as a personal computer via a predetermined recording medium or a network, and loaded in the computer. By executing the program in the computer, functions of the encoding apparatus 2 and decoding apparatus 4 can be implemented on the computer.

Next, detailed description will be made on the adjacent MV selector unit 26 of the encoding apparatus 2 and the adjacent MV selector unit 53 of the decoding apparatus 4, which are associated with the subject of the present invention. Since the adjacent MV selector unit 26 and adjacent MV selector unit 53 may have the same configuration, the adjacent MV selector unit 26 of the encoding apparatus 2 will be described by way of example.

In an embodiment of the present invention, for example, a macro block of a square block of 16×16 pixels is divided into blocks of 4×4 pixels which are the minimum size among seven types of motion compensation block sizes of 16×16 pixels to 4×4 pixels defined in H.264|AVC, and an index value is defined in the raster scan order of a macro block in the unit of a divided block of 4×4 pixels. The block of 4×4 pixels whose index values are defined is called hereinafter a unit block.

Figure 6:
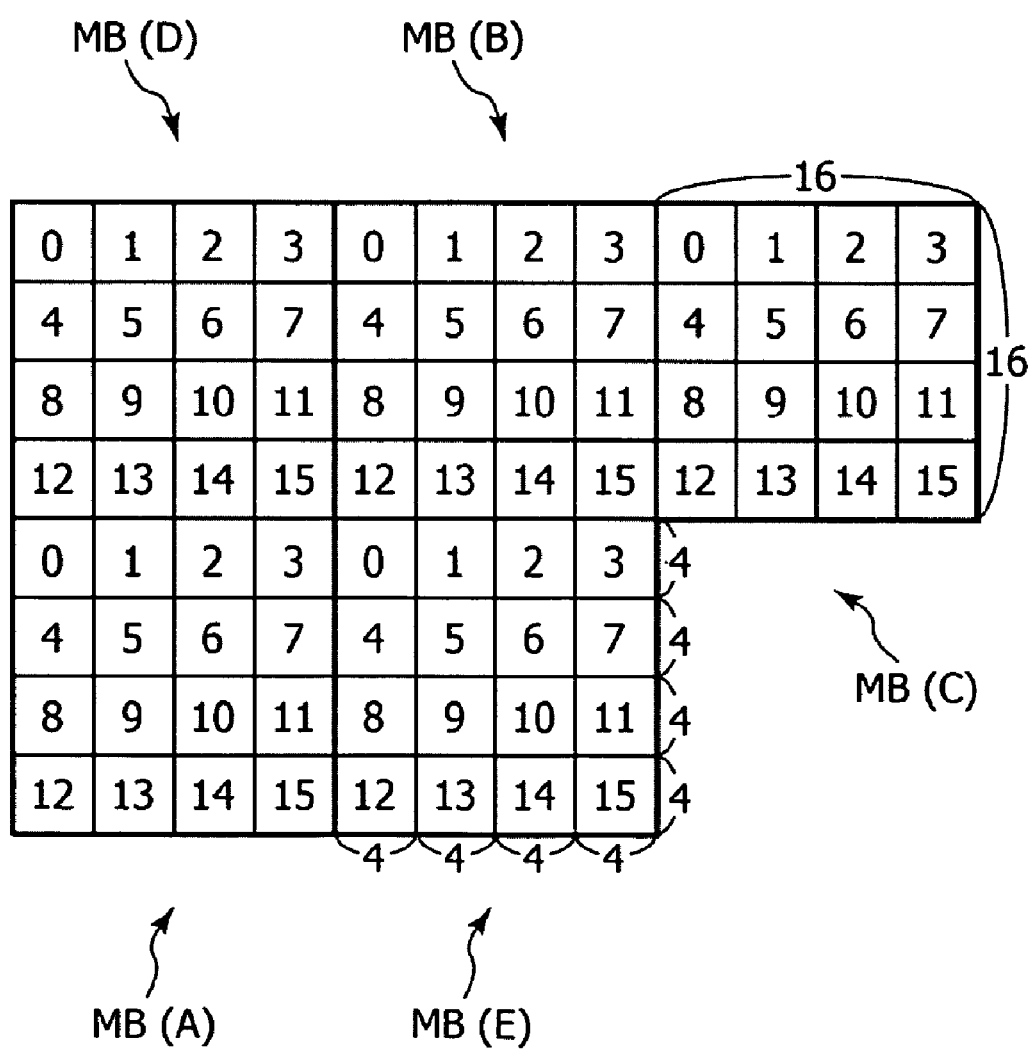
FIG. 6 is a schematic diagram explaining an index value.

Namely, as illustratively shown in FIG. 6, for a macro block (E) to be processed and macro blocks (A) to (D) for obtaining a prediction motion vector, an index value 4'$d$0 is defined for an unit block at the upper left corner of the macro block, the index value is incremented by 1 from a left direction toward a right direction by using the upper left corner as a starting point, and from an upper side toward the lower direction, to define an index value for each unit block. In a notation of "value 4'$dx$" herein used, "4'$d$" means that a right numerical value "x" is represented by a decimal number although it is actually represented by a numerical value of four binary bits.

More specifically, for four unit blocks at the uppermost row of the macro block, index values 4'$d$0, 4'$d$1, 4'$d$2, and 4'$d$3 are defined sequentially from the left, for four unit blocks at the second row, index values 4'$d$4, 4'$d$5, 4'$d$6, and 4'$d$7 are defined sequentially from the left, for four unit blocks at the third row, index values 4'$d$8, 4'$d$9, 4'$d$10, and 4'$d$11 are defined sequentially from the left, and for four unit blocks at the lowermost row, index values 4'$d$12, 4'$d$13, 4'$d$14, and 4'$d$15 are defined sequentially from the left.

In each of the blocks having the above-described seven types of motion compensation block sizes of 16×16 pixels to 4×4 pixels, the leftmost and rightmost blocks are defined to identify an index value lft_idx[3:0] of the leftmost block and an index value rht_idx[3:0] of the rightmost block. The leftmost and rightmost blocks are defined as the leftmost and rightmost unit blocks at the uppermost row of the motion compensation block. A notation of the index value such as lft_idx[3:0] and rht_idx[3:0] means that only four bits on the LSB (Least Significant Bit) side are used when the index value is represented by binary values.

Figure 8:
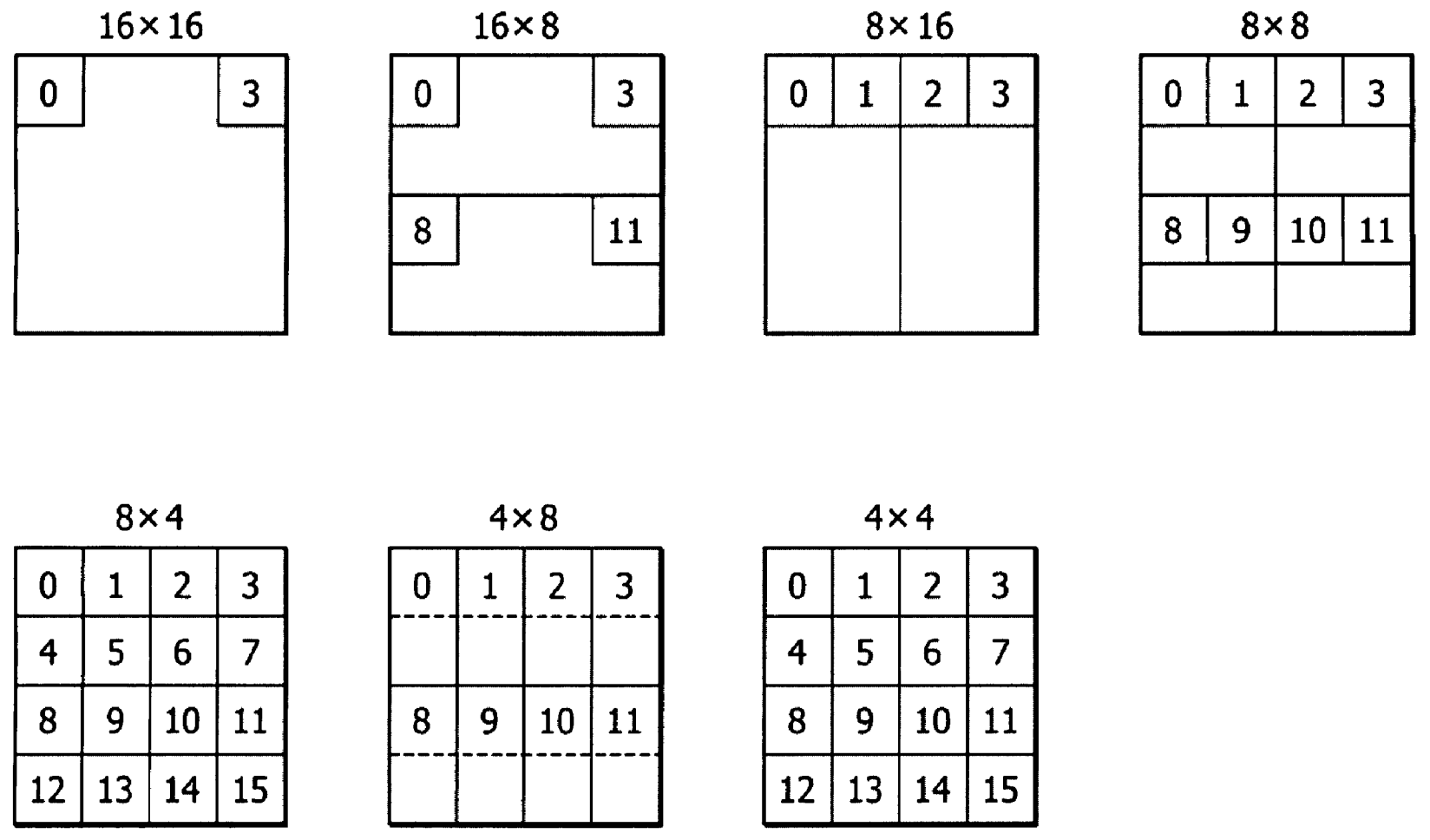

FIG. 7 is an example of a table showing the index value lft_idx[3:0] (value 4'$dx$) and index value rht_idx[3:0] defined for the leftmost and rightmost unit blocks of each of the blocks having seven types of motion compensation block sizes, correlated to the macro block type and submacro block type. This table is stored beforehand, for example, in a Read Only Memory (ROM) (not shown in the FIG. 7) equipped with the encoding apparatus 2. FIG. 8 shows the positions of the leftmost and rightmost unit blocks on the macro blocks having seven types of motion compensation block sizes of 16×16 pixels to 4×4 pixels, and the corresponding index value lft_idx[3:0] (value 4'$dx$) and index value rht_idx[3:0].

Referring to FIG. 7, in the case of the macro block type of 16×16 pixels, the motion compensation block becomes coincident with the macro block, the leftmost unit block has an index value lft_idx[3:0]4'$d$0, and the rightmost unit block has an index value rht_idx[3:0]4'$d$3.

In the case of the macro block type of 16×8 pixels, the motion compensation block is the macro block divided into two parts in a horizontal direction. In the upper motion compensation block, the leftmost unit block has an index value lft_idx[3:0]4'$d$0, and the rightmost unit block has an index value rht_idx[3:0]4'$d$3. In the lower motion compensation block, the leftmost unit block has an index value lft_idx[3:0]4'$d$8, and the rightmost unit block has an index value rht_idx[3:0]4'$d$15.

In the case of the macro block type of 8×16 pixels, the motion compensation block is the macro block divided into two parts in a vertical direction. In the left motion compensation block, the leftmost unit block has an index value lft_idx[3:0]4'$d$0, and the rightmost unit block has an index value rht_idx[3:0]4'$d$11. In the right motion compensation block, the leftmost unit block has an index value lft_idx[3:0]4'$d$2, and the rightmost unit block has an index value rht_idx[3:0]4'$d$3.

In the case of the macro block type of 8×8 pixels, four types of submacro block types of 8×8 pixels, 8×4 pixels, 4×8 pixels and 4×4 pixels are further defined. In the case of the submacro type of 8×8 pixels, the motion compensation block is the macro block divided into two parts in the horizontal and vertical directions, i.e., into four blocks, and the leftmost and rightmost unit blocks at the uppermost row are defined as an index value lft_idx[3:0]4'$dx$ and an index value rht_idx[3:0]4$dy$, similar to the above-described macro block types.

In the cases of submacro types of 4×8 pixels and 4×4 pixels, only one unit block is arranged in the horizontal direction. As a result, it is considered that the same unit block is the leftmost and right most unit blocks, and the same value is also used for the index value lft_idx[3:0] (value 4'$dx$) and index value rht_idx[3:0] (value 4'$dy$).

Figure 9:
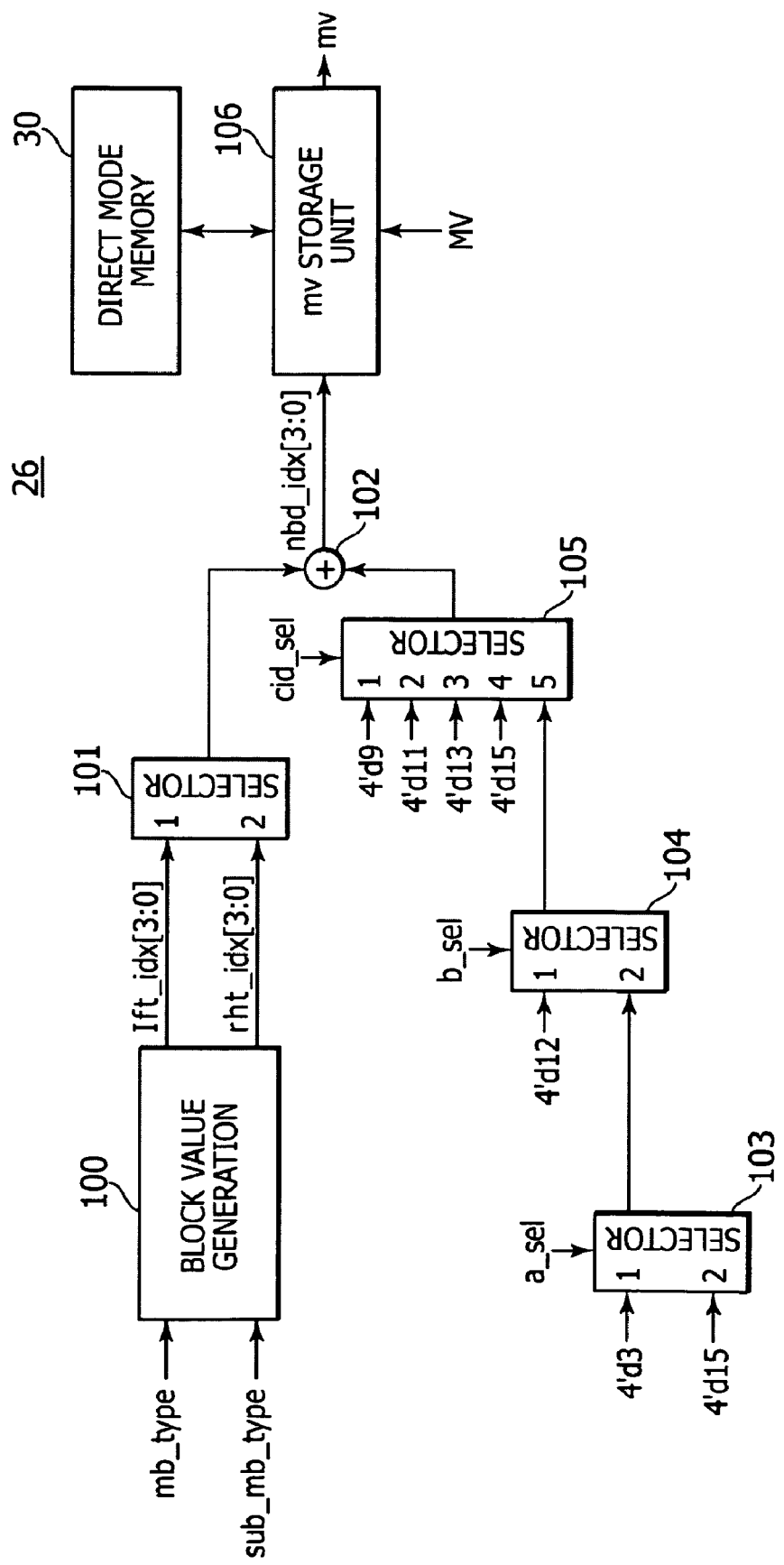
FIG. 9 is a block diagram showing an example of the structure of an adjacent MV selector unit.

FIG. 9 shows an example of the configuration of the adjacent MV selector unit 26. Since the adjacent MV selector unit 53 of the decoder apparatus 4 has approximately the same configuration as that shown in FIG. 9, the description thereof is omitted. The adjacent MV selector unit 26 includes a block value generating unit 100, an adder unit 102, and an mv storage unit 106, as well as four selectors 101, 103, 104, and 105. The mv storage unit 106 is configured in such a manner that read/write relative to the above-described direct mode memory 30 can be controlled.

The block value generating unit 100 is inputted with information mb_type indicating the macro block type and information sub_mb_type indicating the submacro block type, and on the basis of the information mb_type and sub_mb_type, generates the index value lft_idx[3:0]4'$dx$ and index value rht_idx[3:0]4'$dy$ by referring to, for example, the table shown in FIG. 7. For example, if the information mb_type indicates the macro block type of 16×16 pixels, the index values lft_idx[3:0]4'$d$0 and rht_idx[3:0]4'$d$3 are generated by referring to the table shown in FIG. 7, and supplies these values to the block value generating unit 100. The information mb_type and sub_mb_type may be generated, for example, by a control unit (not shown).

The index value lft_idx[3:0]4'$dx$ generated in the block value generating unit 100 is inputted to a first input terminal of the selector 101, and the index value rht_idx[3:0]4'$dy$ is inputted to a second input terminal of the selector 101. For example, in acquiring the motion vector MV(C) of the upper right adjacent block C to the macro block to be processed, the selector 101 is switched to the second input terminal. An output of the selector 101 is inputted to one input terminal of the adder unit 102.

For example, if the block C exists with respect to the macro block to be processed, the selector 101 selects the second input terminal to output an index value rht_idx[3:0]4'$dy$. If the block C does not exist, the block D is used if it exists, as described earlier. In this case, the selector 101 selects the first input terminal to output an index value lft_idx[3:0]4'$dx$.

The selectors 103, 104, and 105 are set with predetermined values, respectively, and select proper values in accordance with the block for which the motion vector MV is acquired. The selector 103 performs selection relating to the block A. For example, index values 4'$d3$ and 4'$d15$ are set to first and second input terminals of the selector 103. In this example, the selector 103, in the case of using the motion vector MV, selects the first input terminal if the value rht_idx[3:0] are one of the values 4'$d0$, 4'$d4$, 4'$d8$, and 4'$d12$, and selects the second input terminal in other cases.

The selector 104 for selection relating to the block B is set, for example, an index value 4'$d12$ at a first input terminal, and an output of the selector 103 is inputted to a second input terminal. In this example, the selector 104 selects the first input terminal when the motion vector MV of the block B is used, and selects the second input terminal in other cases.

The selector 105 for selection relating to the block C is set, for example, with the values 4'$d9$, 4'$d11$, 4'$d13$, and 4'$d15$ at first to fourth input terminals, respectively, and an output of the selector 104 is inputted to a fifth input terminal. An output of the selector 105 is inputted to the other input terminal of the adder unit 102. In this example, the selector 105 selects the fifth input terminal if the motion vector MV of the block A or B is used. The selector 105 selects the first or third input terminal if the motion vector MV of the block C is used, and outputs a value 4'$d9$ or 4'$d13$. The selector 105 selects the second or fourth input terminal if the motion vector MV of the block D is used, and outputs a value 4'$d11$ or 4'$d15$.

The adder unit 102 adds a value supplied from the selector 101 inputted to one input terminal and a value supplied from the selector 105 inputted to the other input terminal. An addition result uses only four bits on the LSB side, and is outputted as an index value nbd-idx[3:0] of an adjacent block. The index value nbd-idx[3:0] is stored in the mv storage unit 106.

The mv storage unit 106 is configured in such a manner that, for example, access control to the direct mode memory 30 can be performed, stores the motion vector MV obtained by the motion prediction/compensation processing unit 28 in the direct mode memory 30, and reads data from an address indicated by the index value lft_idx[3:0]. The embodiment is not limited to this, but the mv storage unit 106 itself may be used as a memory. For example, the mv storage unit 106 performs mapping to the direct mode memory 30 for each unit block to correlate each area corresponding to the unit block to the index value assigned in the raster scan order, as illustratively shown in FIG. 10. When the motion vector MV is supplied to the mv storage unit 106, the motion vector is copied and stored in the unit block area of the direct mode memory 30 corresponding to the motion compensation block corresponding to the macro block type.

For example, if the macro block type is 16×16 pixels, the same motion vector MV is copied to each of unit block areas corresponding to the index values of 0 to 15. Further, for example, if the macro block type is 16×8 pixels, the motion vector MV according to the upper motion compensation block is copied to each of unit blocks corresponding to the index value 0 to 7, and the motion vector MV of the lower motion compensation block is copied to each of unit block areas corresponding to the index value 8 to 15.

As described above, in this embodiment, since the motion vector MB is copied and stored in the unit block area, the motion vector can be read by accessing a predetermined unit block area irrespective of the size of the motion compensation block. It is therefore unnecessary to store information on the size of a motion compensation block adjacent to a block to be processed. Namely, as described earlier, when considering down to the submacro block types, it is not necessary to store parameters having a 6-bit data length indicating macro block types, and parameters sub_mb_type0, sub_mb_type1, sub_mb_type2, and sub_mb_type3 having a 4-bit data length indicating submacro block types.

The mv storage unit 106 reads data from a unit block area of the direct mode memory 30 corresponding to the index value nbd_idx[3:0] supplied from the adder unit 102, and outputs the read data as a motion vector MV. This motion vector MV is supplied to the PMV generating unit 25.

As described above, the mv storage unit 106 of the adjacent MV selector unit 26 assigns index values for the direct mode memory 30 in the raster scan order of each unit block, and stores a corresponding motion vector MV for each unit block. The mv storage unit 106 is made to input index values of the adjacent block to the macro block to be processed which is calculated by the adder unit 102 in accordance with the selection results by the selectors 101, 103, 104, and 105. It is therefore possible to select the motion vector MV(A) of the block A, the motion vector MV(B) of the block B, and the motion vector MV(C) of the block C necessary for obtaining the prediction motion vector PMV of the macro block (macro block E) to be processed.

The adjacent MV selector unit 26 writes the motion vector MV to the direct mode memory 30 as described above. Accordingly, a process in the adjacent MV selector unit 26 is required to be performed after the prediction process in the direct mode is completed.

Figure 11:
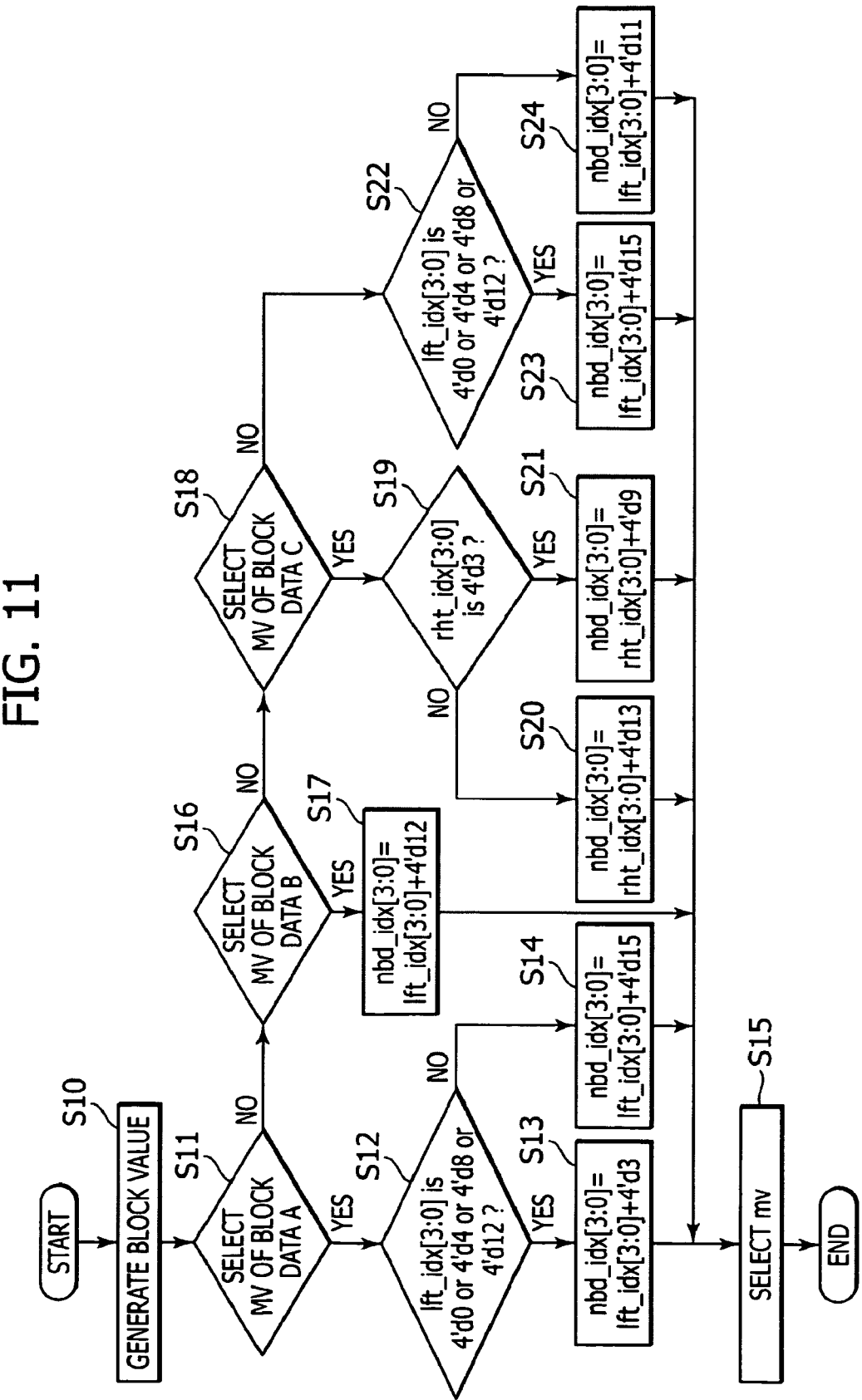
FIG. 11 is a flow chart illustrating an example of processes to be executed by the adjacent MV selector unit.

An example of processes by the adjacent MV selector unit 26 will be described with reference to the flow chart shown in FIG. 11. Each process in this flow chart is performed by a control unit (not shown in the FIG. 11) for controlling the entirety of the encoding apparatus 2 using a predetermined program. The embodiment is not limited to this, but a control signal may be transferred between devices constituting the encoding apparatus 2 in a predetermined manner to make each device operate autonomously and/or cooperatively.

First, in the first Step S10, the block value generating unit 100 is set with the index values lft_idx[3:0] and rht-idx[3:0] in a predetermined manner on the basis of the macro type and submacro type of the processing object macro block E, for example, in accordance with the table shown in FIG. 7, and generates a block value.

If the motion vector MV(A) of the block A is acquired (Step S11), the motion vectors MV(A) of the block A are supplied to the mv storage unit 106, and as already described, copied to unit block areas having corresponding index values on the direct mode memory 30. The selector 101 selects the first input terminal and outputs an index value lft_idx[3:0].

The process advances to Step S12 whereat it is judged whether the index value lft_idx[3:0] is which one of the values 4'$d0$, 4'$d4$, 4'$d8$, and 4'$d12$. If it is judged that the index value lft_idx[3:0] is one of the values 4'$d0$, 4'$d4$, 4'$d8$, and 4'$d12$, then the process advances to Step S13 whereat the index value nbd_idx[3:0] of an adjacent block is obtained as an addition value of index values lft_idx[3:0] and 4'$d3$. When the index value nbd_idx[3:0] of the adjacent block is acquired, the process advances to Step S15.

If it is judged in Step S12 that the index value lft_idx[3:0] is none of the values 4'd0, 4'd4, 4'd8, and 4'd12, then the process advances to Step S14 whereat the index value nbd_idx[3:0] of an adjacent block is obtained as an addition value of index values lft_idx[3:0] and 4'd15. When the index value nbd_idx[3:0] of the adjacent block is acquired, the process advances to Step S15.

If the motion vector MV(B) of the block B is acquired (Step S16), the motion vectors MV(B) of the block B are supplied to the mv storage unit 106, and as already described, copied to unit block areas having corresponding index values on the direct mode memory 30. The selector 101 selects the first input terminal and outputs an index value lft_idx[3:0].

The process advances to Step S17 whereat the index value nbd_idx[3:0] of an adjacent block is obtained as an addition value of index values lft_idx[3:0] and 4'd12. When the index value nbd_idx[3:0] of the adjacent block is acquired, the process advances to Step S15.

If the motion vector MV(C) of the block C is acquired (Step S18), the motion vectors MV(C) of the block C are supplied to the mv storage unit 106, and as already described, copied to unit block areas having corresponding index values on the direct mode memory 30. The selector 101 selects the second input terminal and outputs an index value rht_idx[3:0].

The process advances to Step S19 whereat it is judged whether the index value rht_idx[3:0] is 4'd3. If it is judged that the index value rht_idx[3:0] is 4'd3, the process advances to Step S20 whereat the index value nbd_idx[3:0] of an adjacent block is obtained as an addition value of index values rht_idx[3:0] and 4'd13. As the index value nbd_idx[3:0] of the adjacent block is acquired, the process advances to Step S15.

If it is judged at Step S19 that the index value lft_idx[3:0] is not 4'd3, the process advances to Step S21 whereat the index value nbd_idx[3:0] of an adjacent block is obtained as an addition value of index values rht_idx[3:0] and 4'd9. When the index value nbd_idx[3:0] of the adjacent block is acquired, the process advances to Step S15.

If the upper right adjacent block to the block to be processed does not exist in the same two-dimensional picture area as that of the block to be processed, as described earlier, the motion vectors MV(D) of the upper left adjacent block to the block to be processed are used. In this case, the motion vectors MV(D) of the block D are supplied to the mv storage unit 106, and as already described, copied to unit block areas having corresponding index values on the direct mode memory 30. The selector 101 selects the first input terminal and outputs an index value lft_idx[3:0].

In Step S22, it is judged whether the index value lft_idx[3:0] is which one of the values 4'd0, 4'd4, 4'd8, and 4'd12. If it is judged that the index value lft_idx[3:0] is one of the values 4'd0, 4'd4, 4'd8, and 4'd12, then the process advances to Step S23 whereat the index value nbd_idx[3:0] of an adjacent block is obtained as an addition value of index values lft_idx[3:0] and 4'd15. When the index value nbd_idx[3:0] of the adjacent block is acquired, the process advances to Step S15.

If it is judged at Step S22 that the index value lft_idx[3:0] is none of the values 4'd0, 4'd4, 4'd8, and 4'd12, then the process advances to Step S24 whereat the index value nbd_idx[3:0] of an adjacent block is obtained as an addition value of index values lft_idx[3:0] and 4'd11. When the index value nbd_idx[3:0] of the adjacent block is acquired, the process advances to Step S15.

In Step S15, on the basis of the acquired index value nbd_idx[3:0] of the adjacent block, the mv storage unit 106 reads the motion vector MV stored in the direct mode memory 30. This motion vector MV is supplied to the PMV generating unit 25.

Figure 12:
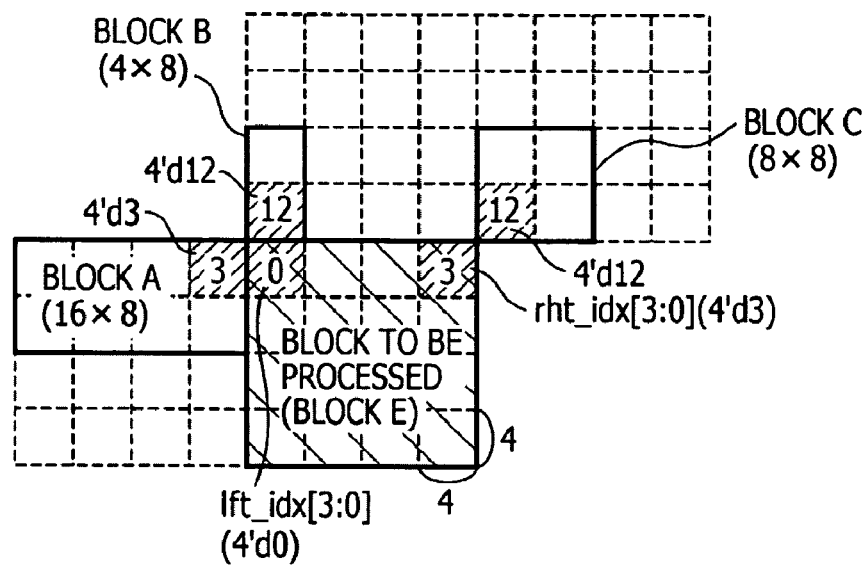
FIG. 12 is a schematic diagram to be used for specifically describing processes to be performed by the adjacent MV selector unit.

The processes by the adjacent MV selector unit 26 illustrated in the flow chart of FIG. 11 will be described by using a more specific example. Consider now for example the case shown in FIG. 12. Namely, it is assumed that the processing object macro block (block E) is a block having a macro type of 16×16 pixels. It is also assumed that the left adjacent block A, upper adjacent block B, and upper right adjacent block C necessary for obtaining the prediction motion vector PMV of the block E have the following state. The block A is a block having a macro block type of 16×8 pixels, the block B is a block having a macro block type of 4×8 pixels and a submacro block type of 4×8 pixels, and the block C is a block having a macro block type of 8×8 pixels and a submacro block type of 8×8 pixels.

For the block E to be processed, the block value generating unit 100 sets a value 4'd0 as the index value lft_idx[3:0], and a value 4'd3 as the index value rht_idx[3:0], in accordance with the table shown in FIG. 7 (Step S10).

If the motion vector MV(A) of the block A is to be acquired (Step S11), the motion vectors MV(A) of the block A are supplied to the mv storage unit 106, and then copied to the unit block areas having the index values 0 to 7 on the direct mode memory 30 corresponding to the macro block type of the block A. To the unit block areas having the index values 8 to 15, the motion vectors MV in the area of 16×8 pixels lower side of the block A are copied.

The selector 101 selects the first input terminal and inputs the index value lft_idx[3:0] (value 4'd0) to one input terminal of the adder unit 102. Since the index value is the value 4'd0, judgment in Step S12 advances a process to Step S13.

The selector 103 selects the first input terminal to select the value 4'd3, and the selectors 104 and 105 select the second and fifth input terminals respectively to input the value 4'd3 outputted from the selector 103 to the other input terminal of the adder unit 102. The adder unit 102 adds the index value lft_idx[3:0]4'd0 inputted to one input terminal and the value 4'd3 inputted to the other input terminal, and outputs an index value nbd-idx[3:0]4'd3 as the addition result (Step S13).

The mv storage unit 106 reads the motion vector MV(A) written in the unit block area indicated by the index value nbd-idx[3:0] 4'd3 (Step S15). The motion vector MV(A) is supplied to the PMV generating unit 25.

If the motion vector MV(B) of the block B is to be acquired (Step S16), first the motion vectors MV(B) of the block B are supplied to the mv storage unit 106, and copied to each of the unit block areas having the index values 8 and 12 on the direct mode memory 30 corresponding to the macro block type and submacro block type of the block B. Similarly, to the other unit block areas, the motion vectors MV of a block corresponding to the macro block containing the block B are copied to each unit block.

The selector 101 selects the first input terminal and inputs the index value lft_idx[3:0]4'd0 to one input terminal of the adder unit 102. The selector 104 selects the first input terminal to output the value 4'd12 and the selector 105 selects the fifth input terminal to input the value 4'd12 output from the selector 104 to the other input terminal of the adder unit 102. The adder unit 102 adds the index value lft_idx[3:0]4'd0 inputted to one input terminal and the value 4'd12 inputted to the other input terminal, and outputs an index value nbd-idx[3:0]4'd12 as the addition result (Step S17).

The mv storage unit 106 reads the motion vector MB(B) written in the unit block area indicated by the index value nbd-idx[3:0]4'd12 from the direct mode memory 30 (Step S15). The motion vector MV(B) is supplied to the PMV generating unit 25.

If the motion vector MV(C) of the block C is to be acquired (Step S18), first the motion vectors MV(C) of the block C are supplied to the mv storage unit 106, and copied to each of the unit block areas having the index values 8, 9, 12, and 13 on the direct mode memory 30 corresponding to the macro block type and submacro block type of the block C. Similarly, to the other unit block areas of the mv storage unit 106, the motion vectors MV of a block corresponding to the macro block containing the block C are copied to each unit block.

The selector 101 selects the second input terminal and inputs the index value rht_idx[3:0] (value 4'd3) to one input terminal of the adder unit 102. Since the index value rht_idx[3:0] is the value 4'd3, the process advances to Step S20.

The selector 105 selects the first input terminal to output the value 4'd9 and input to the other input terminal of the adder unit 102. The adder unit 102 adds the index value rht_idx[3:0]4'd3 inputted to one input terminal and the value 4'd9 inputted to the other input terminal, and outputs an index value nbd-idx[3:0]4'd12 as the addition result (Step S20). The mv storage unit 106 reads the motion vector MB(C) written in the unit block area indicated by the index value nbd-idx[3:0] 4'd12 (Step S15). The motion vector MV(C) is supplied to the PMV generating unit 25.

As already described, if the block C does not exist in the same two-dimensional picture area as that of the block E, the motion vectors MV(D) of the upper left block contacting the block E are used for obtaining the prediction motion vector PMV. In this case, as described earlier, in Step S22, if the index value lft_idx[3:0] is the value 4'd0 as in the example shown in FIG. 11, the process advances to Step S23. The selector 105 selects the fourth input terminal to output a value 4'd15. The value 4'd15 is inputted to the other input terminal of the adder unit 102. The adder unit 102 adds the index value lft_idx[3:0]4'd0 inputted to one input terminal and the value 4'd15 inputted to the other input terminal, to obtain an index value nbd-idx[3:0]4'd15 as the addition result. The unit block of the index value 4'd15 is positioned at the lower right corner of the macro block and contacts the upper left of the block E.

It may be considered that the above-described process is performed by sequentially inputting information on mb_type and sub_mb_type, similar to sequentially generated the leftmost and rightmost index values lft_idx[3:0] and rht_idx[3:0] from the upper side shown in FIG. 7. In this manner, the prediction motion vector PMV of the block E to be processed can be obtained for each macro block type (and for each submacro block type).

In this case, if the macro block type of the block E is 8×8 pixels, the prediction motion vector PMV of the block E may happen to be obtained by using information on the macro block containing the block E. The process is therefore performed in the raster scan order of the macro block.

In the above description, although the block E to be processed has the same size as the macro block having the macro block type of 16×16 pixels, the embodiment is not limited thereto. Namely, the adjacent MV select process of the embodiment is also applicable to another macro block type.

Figure 13:
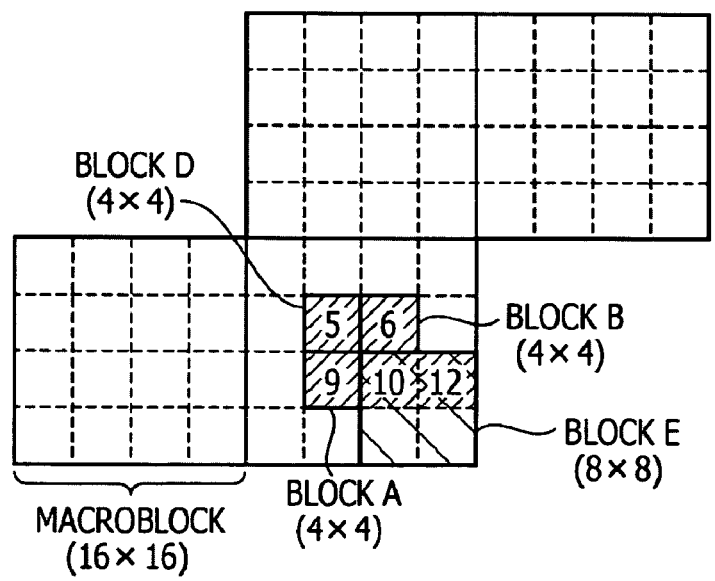
FIG. 13 is a schematic diagram to be used for specifically describing processes to be performed by the adjacent MV selector unit.

Description will be made, for example, in a case where, as shown in FIG. 13, the block E to be processed has a size of 8×8 pixels, i.e., the macro block type and submacro block type of the block E is 8×8 pixels. The block E is assumed to be positioned at a lower left corner of the macro block containing the block E. Regarding a block necessary for obtaining the prediction motion vector PMV of the block E, a block D contacting the upper left corner of the block E is used because the block E to be processed is positioned at the lower left corner and the block C contacting the upper right corner does no exist. The block D, and the left adjacent block A and upper adjacent block B to the block E are assumed having the macro block type and submacro block type of 4×4 pixels.

For the processing object block E, the block value generating unit 100 sets a value 4'd10 as the index value lft_idx[3:0], and sets a value 4'd11 as the index value rht_idx[3:0], in accordance with the table shown in FIG. 7 (Step S10).

If the motion vector MV(A) of the block A is to be acquired (Step S11), the motion vectors MV(A) of the block A are supplied to the mv storage unit 106, and copied to the unit block area having the index value 9 on the direct mode memory 30 corresponding to the macro block type and submacro block type of the block A.

The selector 101 selects the first input terminal to select the index value lft_idx[3:0]4'd0 to be input to one input terminal of the adder unit 102. Since the index value is the value 4'd10, judgment in Step S12 advances a process to Step S14.

The selector 103 selects the second input terminal to select the value 4'd15, and the selectors 104 and 105 select the second and fifth input terminals respectively to input the value 4'd15 outputted from the selector 103 to the other input terminal of the adder unit 102. The adder unit 102 adds the index value lft_idx[3:0]4'd10 inputted to one input terminal and the value 4'd15 inputted to the other input terminal, and outputs an index value nbd-idx[3:0]4'd9 as the addition result (Step S13).

Namely, the addition result is the value 4'd25 whose binary notation is "b11001" (b indicates that the following numerical values are expressed by a binary notation). However, the index value nbd_idx[3:0] uses only four bits on the LSB side as already described, the value is "b1001" and the value 4'd9 is obtained.

The mb storage unit 106 reads the motion vector MV(A) written in the unit block area indicated by the index value nbd-idx[3:0] 4'd9 from the direct mode memory 30 (Step S15). The motion vector MV(A) is supplied to the PMV generating unit 25.

If the motion vector MV(B) of the block B is to be acquired (Step S16), first the motion vectors MV(B) of the block B are supplied to the mv storage unit 106, and copied to the unit block area having the index value 6 on the direct mode memory 30 corresponding to the macro block type and submacro block type of the block B.

The selector 101 selects the first input terminal and inputs the index value lft_idx[3:0]4'd0 to one input terminal of the adder unit 102. The selector 104 selects the first input terminal to output the value 4'd12, and the selector 105 selects the sixth input terminal to input the value 4'd12 outputted from the selector 104 to the other input terminal of the adder unit 102. The adder unit 102 adds the index value lft_idx[3:0]4'd0 inputted to one input terminal and the value 4'd12 inputted to the other input terminal, and outputs an index value nbd-idx[3:0]4'd12 as the addition result (Step S17).

The mv storage unit 106 reads the motion vector MB(B) written in the unit block area indicated by the index value nbd-idx[3:0] (value 4'd12) (Step S15). The motion vector MV(B) is supplied to the PMV generating unit 25.

Next, the motion vector MV(C) of the block C is acquired. In this example, a block whose prediction encoding has already completed does not exist contacting an upper right corner of the block E to be processed. As a result, instead of the block C, the motion vectors MV(D) of the block D are acquired. The motion vectors MV(D) of the block D are supplied to the mv storage unit 106, and copied to the unit block area having the index value 5 on the direct mode memory 30 corresponding to the macro block type and submacro block type of the block D.

The selector 105 selects the first input terminal to input the index value rht_idx[3:0]4'd10 to one input terminal of the adder unit 102. Since the index value rht_idx[3:0] is the value 4'd10, the process advances to Step S24.

The selector 105 selects the second input terminal to output a value 4'd11 which is inputted to the other input terminal of the adder unit 102. The adder unit 102 adds the index value lft_idx[3:0]4'd10 inputted to one input terminal and the value 4'd11 inputted to the other input terminal, and outputs an index value nbd-idx[3:0]4'd5 as the addition result.

Namely, the addition result is the value 4'd21 whose binary notation is "b10101". However, the index value nbd_idx[3:0] uses only four bits on the LSB side, the value is "b0101" and the value 4'd5 is obtained. The unit block having the index value 4'd5 contacts the upper left of the block E.

As described earlier, in order to obtain the prediction motion vector of the macro block E to be processed, for example, if the motion vector of the macro block B is selected, $259^2=67081$ combinations exist between the macro block E and macro block B. A processing time becomes very long, and the calculation circuit is required to have a high processing ability.

Figure 10:
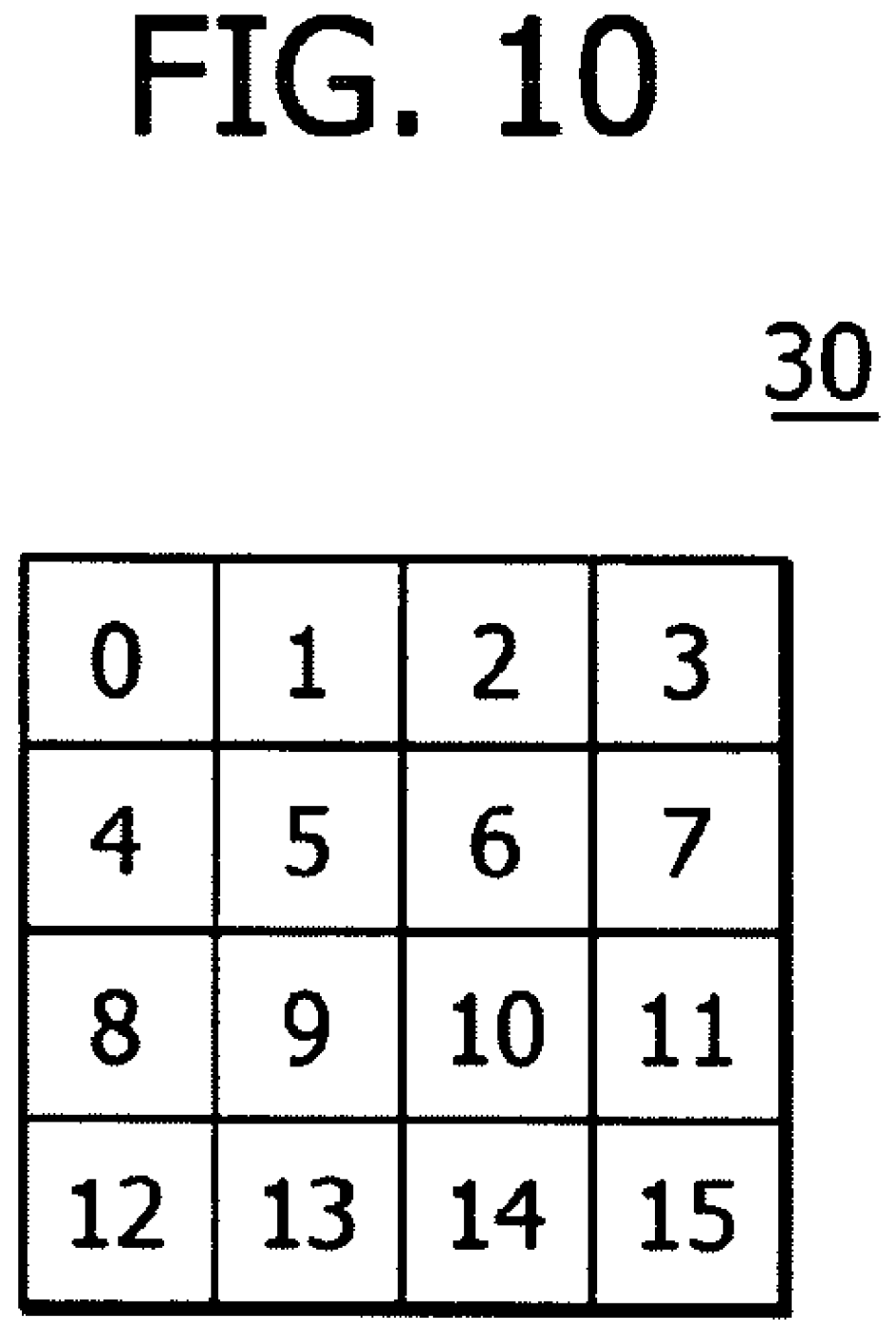

On the other hand, according to embodiments of the present invention, as illustratively shown in FIG. 10, the mv storage unit 106 stores the motion vectors MV for each unit block of 4×4 pixels assigned n the raster scan order. As a result, the motion vectors MV(B) of the macro block B may be obtained only by the addition process of lft_idx[3:0]+value 4'd12. It is therefore possible to shorten a processing time and reduce a calculation amount.

Next, a modification of the embodiment of the present invention will be described. Although the index values of each unit block of 4×4 pixels are assigned in the raster scan order, the embodiment is not limited thereto. For example, according to the H.264|AVC specifications, in performing intra-frame prediction encoding (intra encoding) in the unit of 4×4 pixels, as illustratively shown in FIG. 14, a macro block of 16×16 pixels is divided in four middle blocks of 8×8 pixels, each middle block is divided into small blocks of 4×4 pixels, the middle blocks are encoded in the order of upper left, upper right, lower left and lower right, and each middle block is encoded similarly in the order of upper left, upper right, lower left and lower right.

The modification of the embodiment assigns index values to each unit block area in the encoding order of intra encoding stipulated in H.264|AVC. Brief description will be made on the processes to be performed by the adjacent MV selector unit 26.

Figure 14:
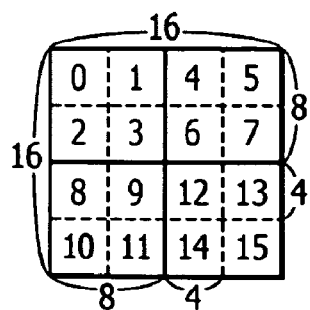
FIG. 14 is a schematic diagram illustrating index value assignment according to a modification of the embodiment.
Figure 15:
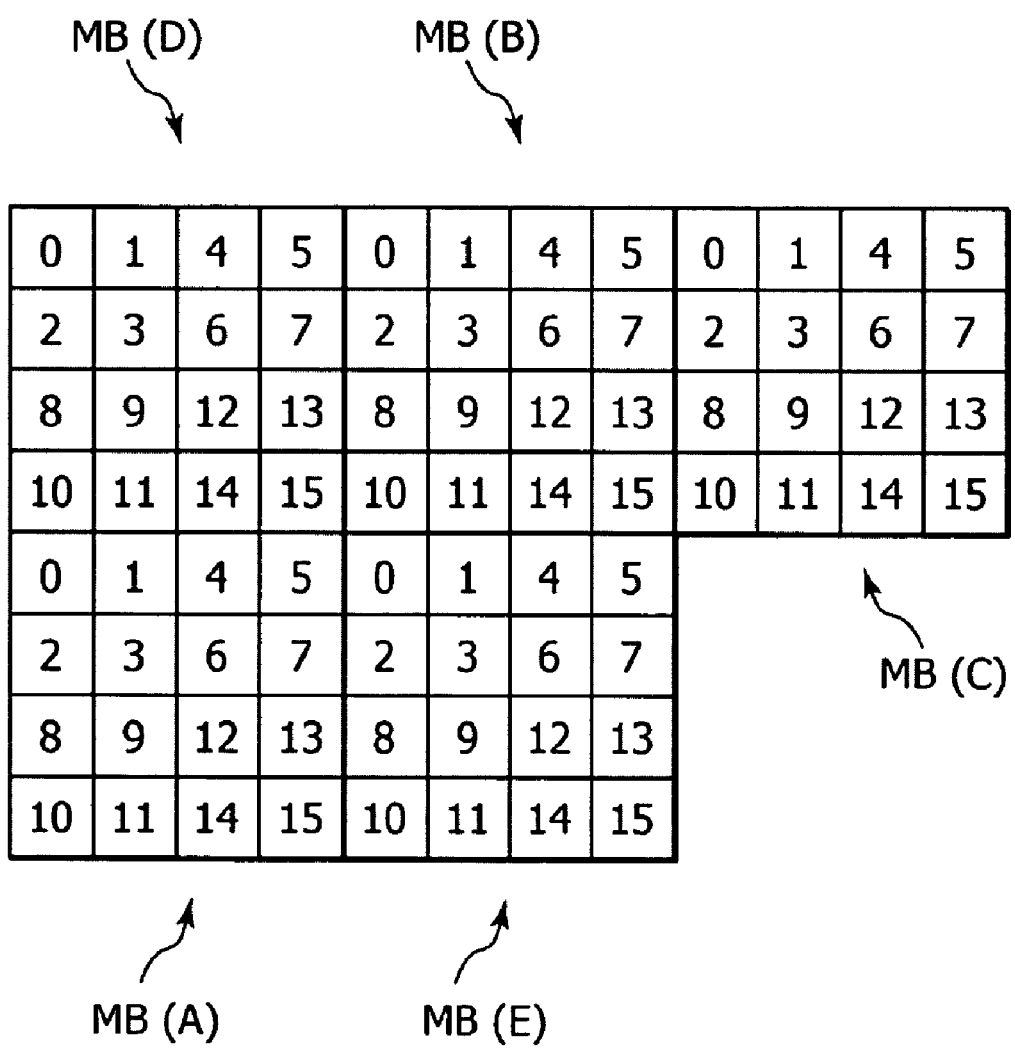
FIG. 15 is a schematic diagram illustrating macro blocks (A) to (E), with macro blocks (A) to (D) for obtaining a prediction MV.

As illustratively shown in FIG. 15, for a macro block (E) to be processed and each of macro blocks (A) to MB(D) for obtaining a prediction motion vector, the macro block is divided into middle blocks of 8×8 pixels which are arranged in the macro block in the order of upper left, upper right, lower left, and lower right, and each middle block is divided into small blocks of 4×4 pixels, as described using FIG. 14. An index value is assigned to each small block, sequentially from a start point at the upper left of the middle block and incrementing by 1, in the order of upper left, upper right, lower left, and lower right. The index value is assigned by sequentially increasing its value for each middle block.

FIGS. 16 to 19 show examples of the processes by the adjacent MV selector unit 26 according to a modification of the embodiment. FIGS. 16 to 19 correspond to the processes of acquiring motion vectors MV of the blocks A, B, C, and D shown in FIG. 11. In FIGS. 16 to 19, common portions to those shown in FIG. 11 are represented by identical reference symbols, and the detailed description thereof is omitted.

Figure 16:
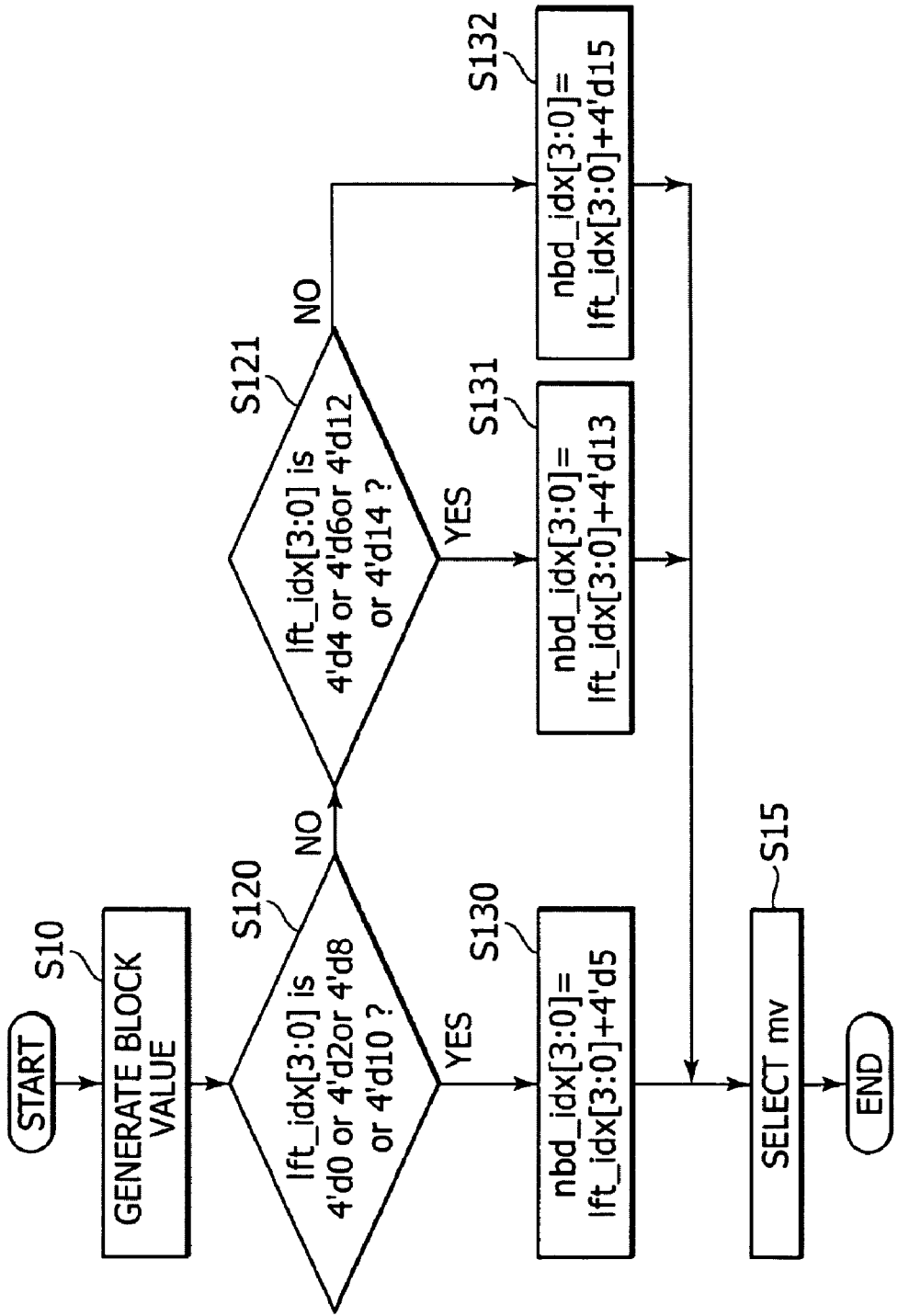
FIG. 16 is a flow chart illustrating an example of processes of acquiring motion vectors MV of a block A according to the modification of the embodiment.

FIG. 16 illustrates an example of a process of acquiring a motion vector MV of the block A according to a modification of the embodiment. FIG. 16 corresponds to the process in Step S11 and following Steps for acquiring the motion vector MV of the block A illustrated in FIG. 11. In the modification of the embodiment, one judgment branch process is added as compared to acquisition of the motion vector MV of the block A of the embodiment.

Namely, in the example shown in FIG. 16, it is judged whether the index value lft_idx[3:0] is any one of the values 4'd0, 4'd2. 4'd8, and 4'd10, or any one of the values 4'd4, 4'd6, 4'd1,2 and 4'd14, or other values. In accordance with the judgment result, the index value nbd_idx[3:0] of the adjacent block is obtained.

More specifically, if it is judged that index value lft_idx[3:0] is any one of the values 4'd0, 4'd2, 4'd8, and 4'd10 (Step S120), the index value nbd_idx[3:0] of the adjacent-block is obtained as an addition value of the index value lft_idx[3:] and the value 4'd5 (Step S130). If it is judged that the index value lft_idx[3:0] is any one of the values 4'd4, 4'd6, 4'd12, and 4'd14 (Step S121), the index value nbd_idx[3:0] of the adjacent block is obtained as an addition value of the index value lft_idx[3:0] and the value 4'd13 (Step S131). If it is judged that the index value lft_idx[3:0] is a value other than these values, the index value nbd_idx[3:0] of the adjacent block is obtained as an addition value of the index value lft_idx[3:0] and the value 4'd15 (Step 132)

Figure 17:
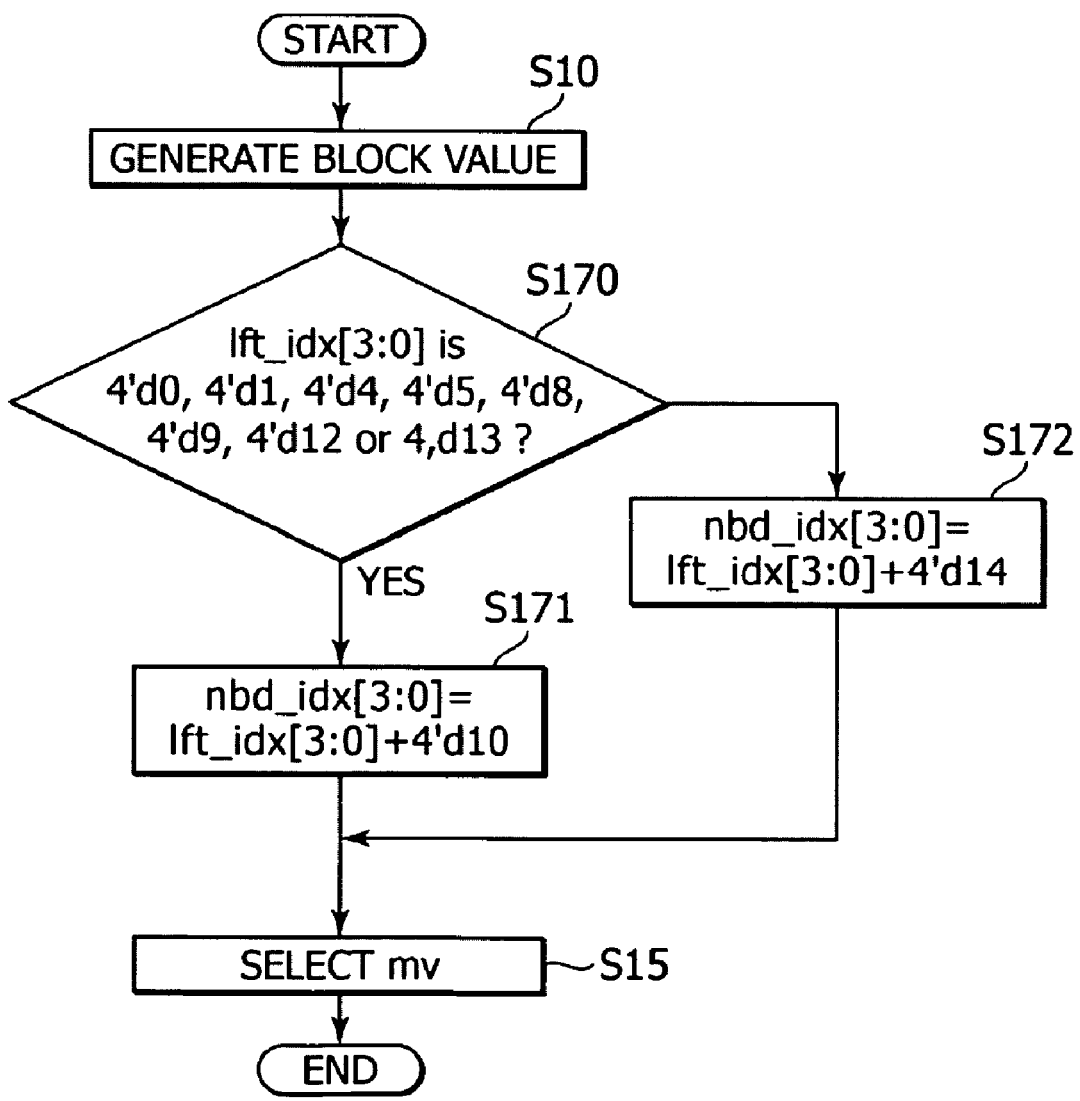
FIG. 17 is a flow chart illustrating an example of processes of acquiring motion vectors MV of a block B according to the modification of the embodiment.

FIG. 17 illustrates an example of a process of acquiring a motion vector MV of the block B according to a modification of the embodiment. FIG. 17 corresponds to the process in Step S16 and following Steps for acquiring the motion vector MV of the block B illustrated in FIG. 11. As seen from comparison between FIGS. 17 and 11, in the modification of the embodiment, one judgment branch process is added as compared to acquisition of the motion vector MV of the block B of the embodiment.

Namely, in the example shown in FIG. 17, it is judged whether the index value lft_idx[3:0] is any one of the values 4'd0, 4'd1, 4'd4, 4'd5, 4'd8, 4'd9, 4'd12, and 4'd13 (Step S170), and in accordance with the judgment result, the index value nbd_idx[3:0] of the adjacent block is obtained.

More specifically, if it is judged that lft_idx[3:0] is any one of the index values 4'd0, 4'd1. 4'd4, 4'd5, 4'd8, 4'd9, 4'd12, and 4'd13 (Step S170), the index value nbd_idx[3:0] of the adjacent block is obtained as an addition value of the index value lft_idx[3:0] and the value 4'd10 (Step S171). If it is judged that the index value lft_idx[3:0] is a value other than these values, the index value nbd_idx[3:0] of the adjacent block is obtained as an addition value of the index value lft_idx[3:0] and the value 4'd14 (Step 172).

Figure 18:
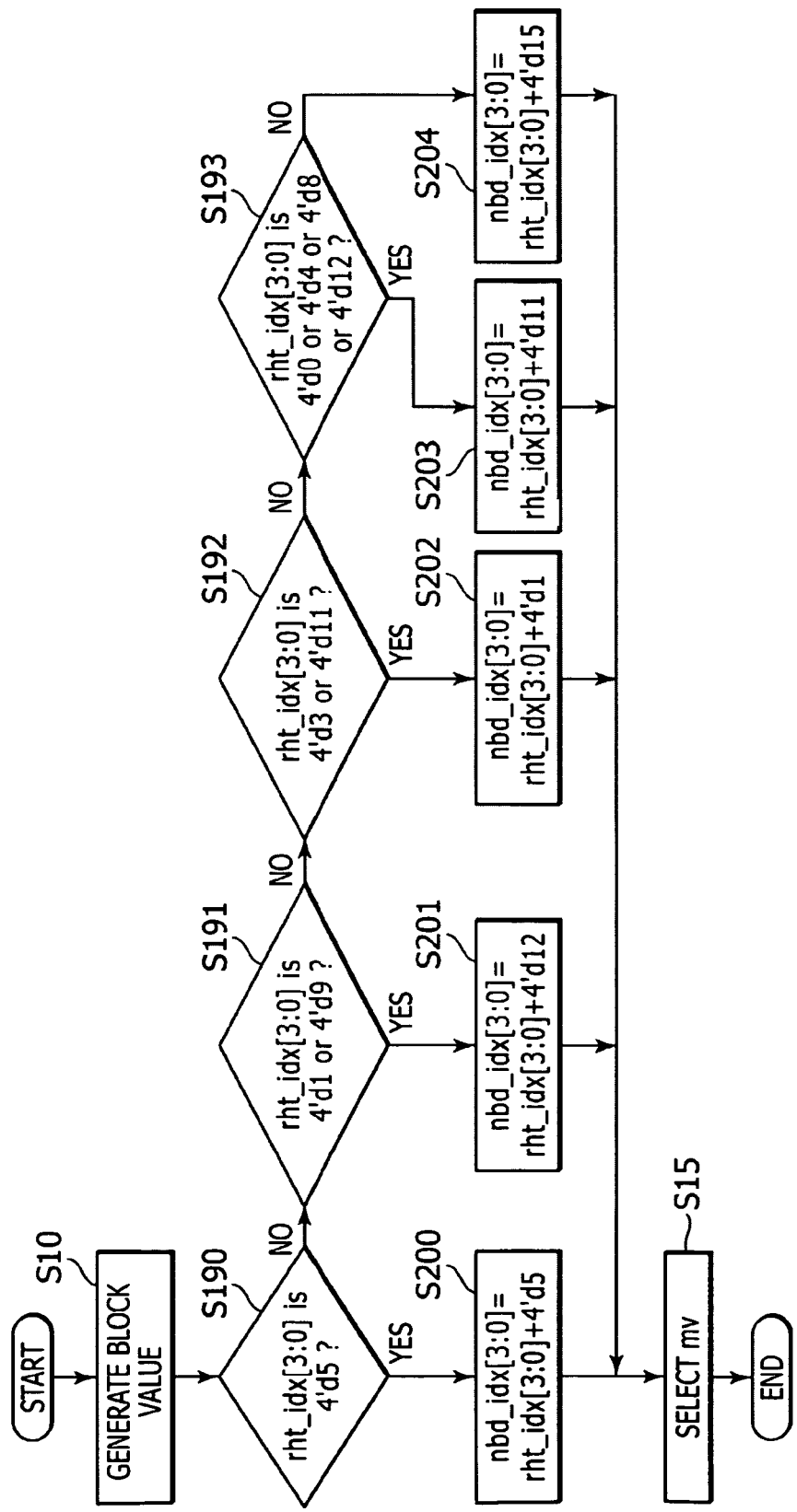
FIG. 18 is a flow chart illustrating an example of processes of acquiring motion vectors MV of a block C according to the modification of the embodiment.

FIG. 18 illustrates an example of a process of acquiring a motion vector MV of the block C according to a modification of the embodiment. FIG. 18 corresponds to the process in Step S18 and following Steps for acquiring the motion vector MV of the block C illustrated in FIG. 11. As seen from comparison between FIGS. 18 and 11, in the modification of the embodiment, three judgment branch processes are added as compared to acquisition of the motion vector MV of the block C of the embodiment.

Namely, in the example shown in FIG. 18, it is judged whether the index value rht_idx[3:0] is the value 4'd5, or any one of the values 4'd1 and 4'd9, or any one of the values 4'd3 and 4'd11, or any one of the values 4'd0, 4'd4, 4'd8, and 4'd12, or other values. In accordance with the judgment result, the index value nbd_idx[3:0] of the adjacent block is obtained.

More specifically, if it is judged that index value rht_idx[3:0] is the value 4'd5 (Step S190), the index value nbd_idx

[3:0] of the adjacent block is obtained as an addition value of the index value lft_idx[3:0] and the value 4'd5 (Step S200). If it is judged that the index value lft_idx[3:0] is any one of the values 4'd1 and 4'd9 (Step S191), the index value nbd_idx[3:0] of the adjacent block is obtained as an addition value of the index value rht_idx[3:0] and the value 4'd12 (Step S201). If it is judged that the index value rht_idx[3:0] is any one of the values 4'd3 and 4'd11 (Step S192), the index value nbd_idx[3:0] of the adjacent block is obtained as an addition value of the index value rht_idx[3:0] and the value 4'd1 (Step S202).

If it is judged that the index value rht_idx[3:0] is any one of the values 4'd0, 4'd4, 4'd8, and 4'd12 (Step S193), the index value nbd_idx[3:0] of the adjacent block is obtained as an addition value of the index value rht_idx[3:0] and the value 4'd11 (Step S203). If it is judged that the index value rht_idx[3:0] is a value other than these values, the index value nbd_idx[3:0] of the adjacent block is obtained as an addition value of the index value rht_idx[3:0] and the value 4'd15 (Step 204).

Figure 19:
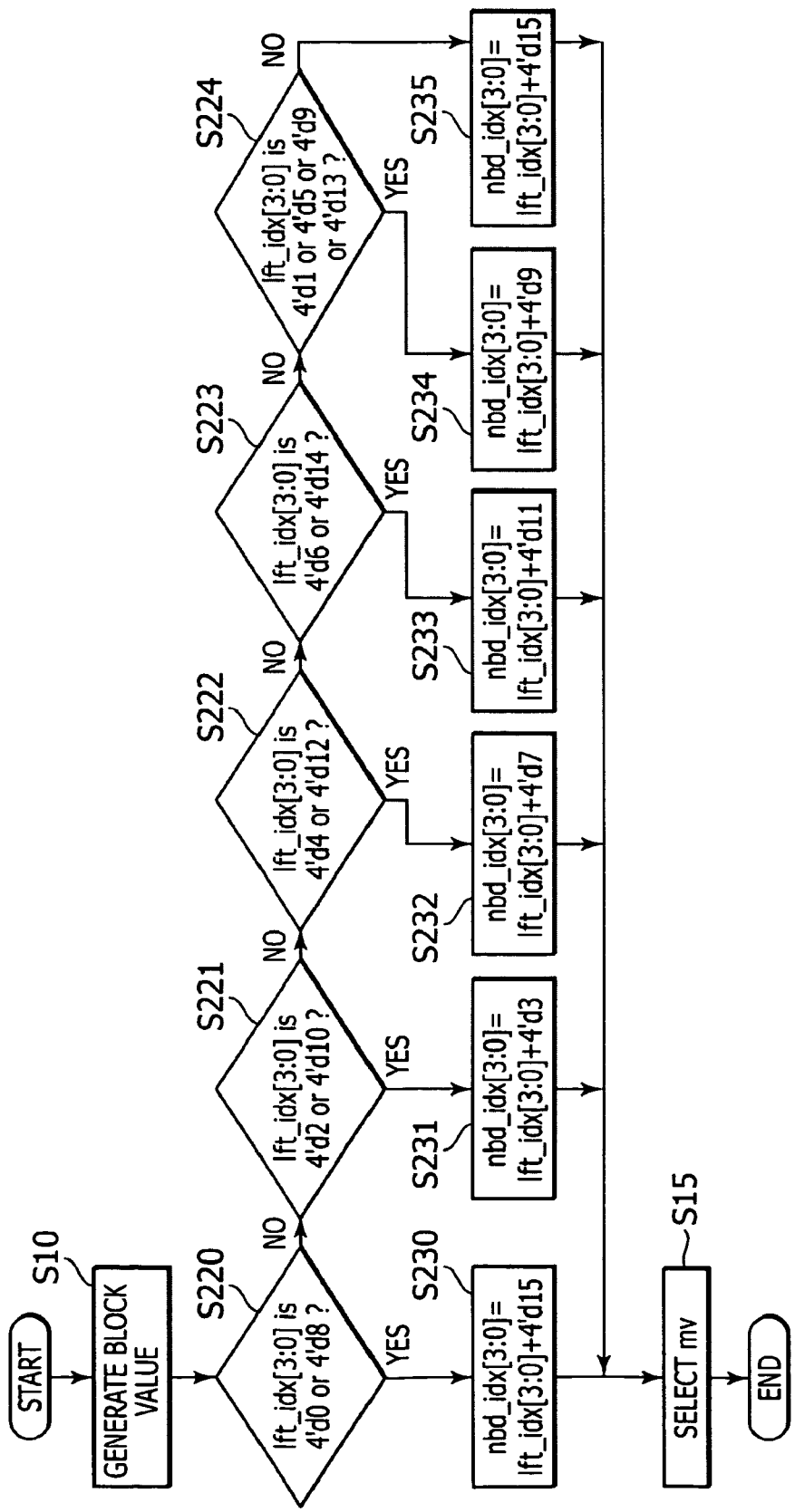
FIG. 19 is a flow chart illustrating an example of processes of acquiring motion vectors MV of a block D according to the modification of the embodiment.
Figure 20A:
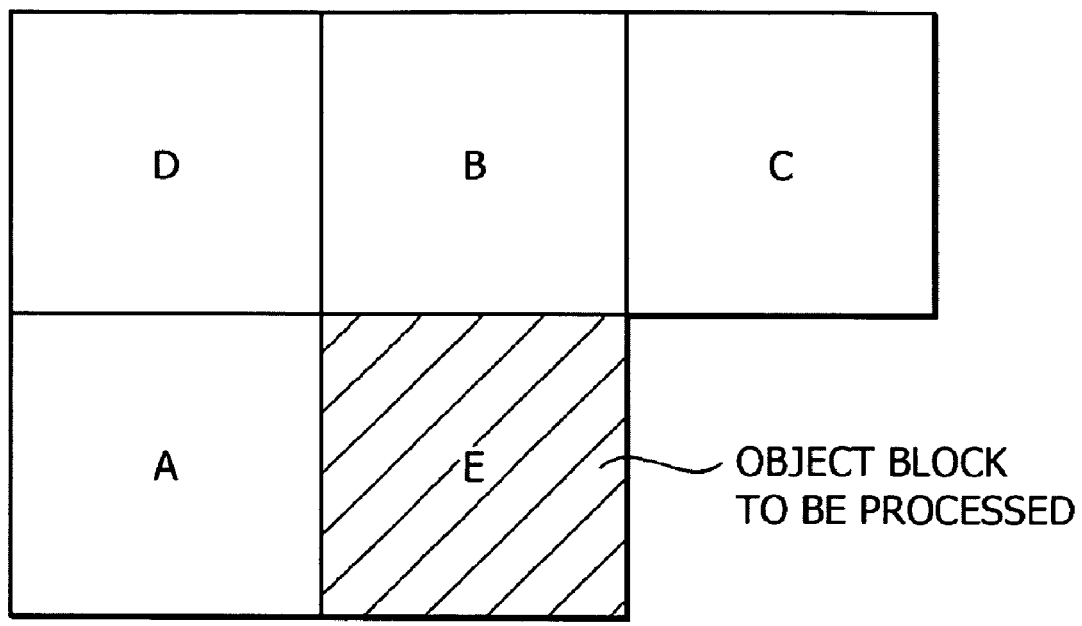
FIGS. 20A and 20B are schematic diagrams illustrating encoding using a prediction motion vector.
Figure 20B:
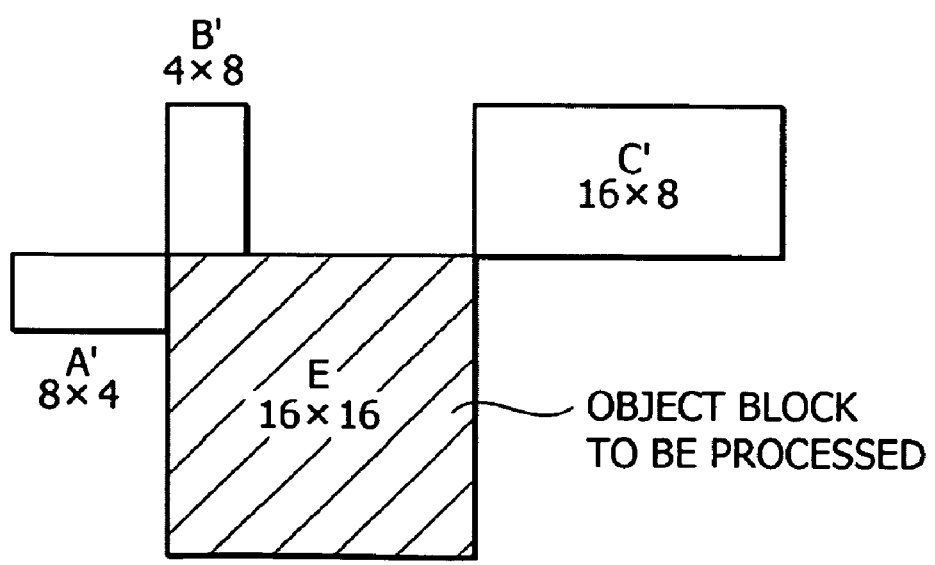
Figure 21:
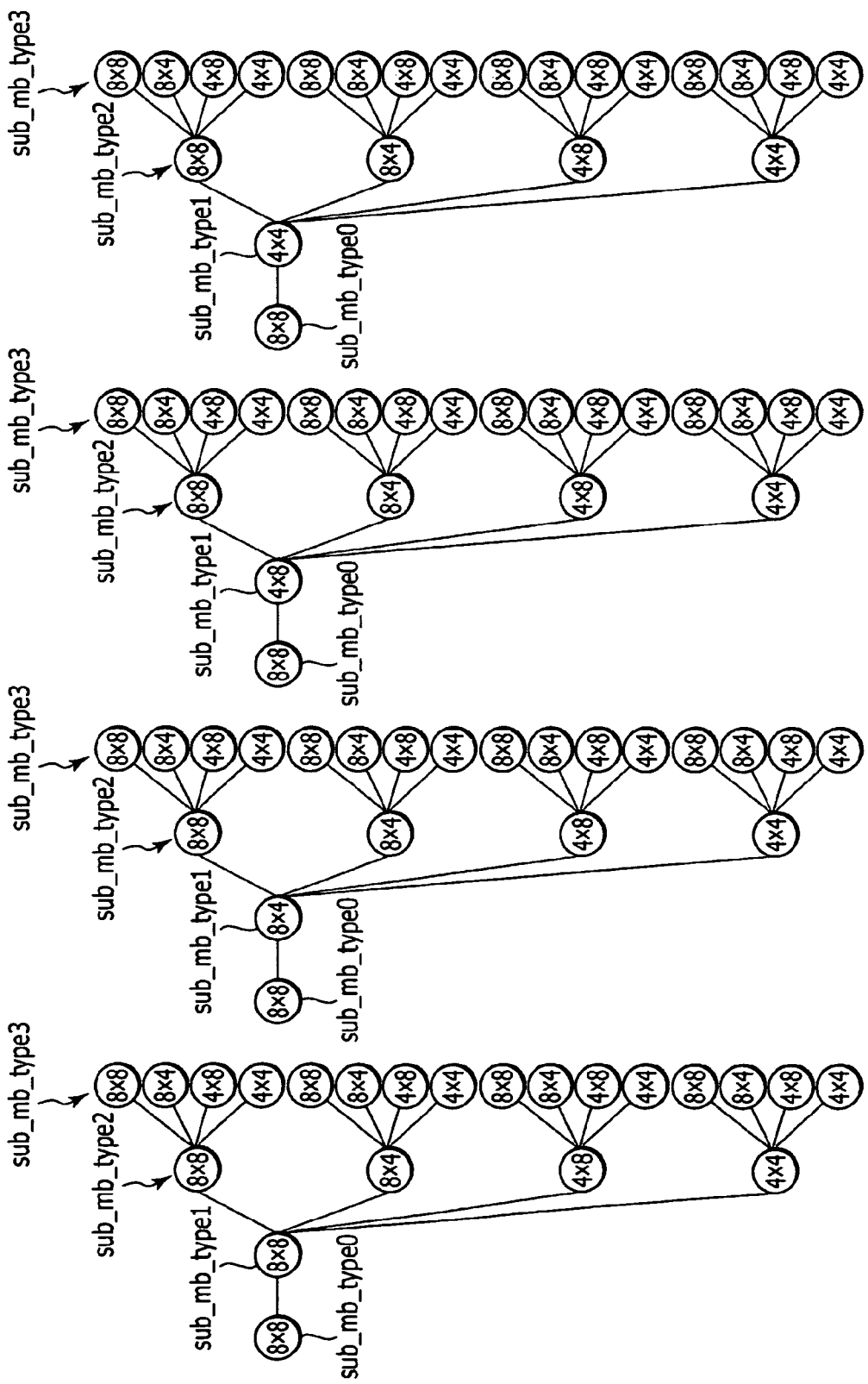
FIG. 21 is a schematic diagram showing combinations of submacro blocks in a macro block having a size of 16×16 pixels.
Figure 22:
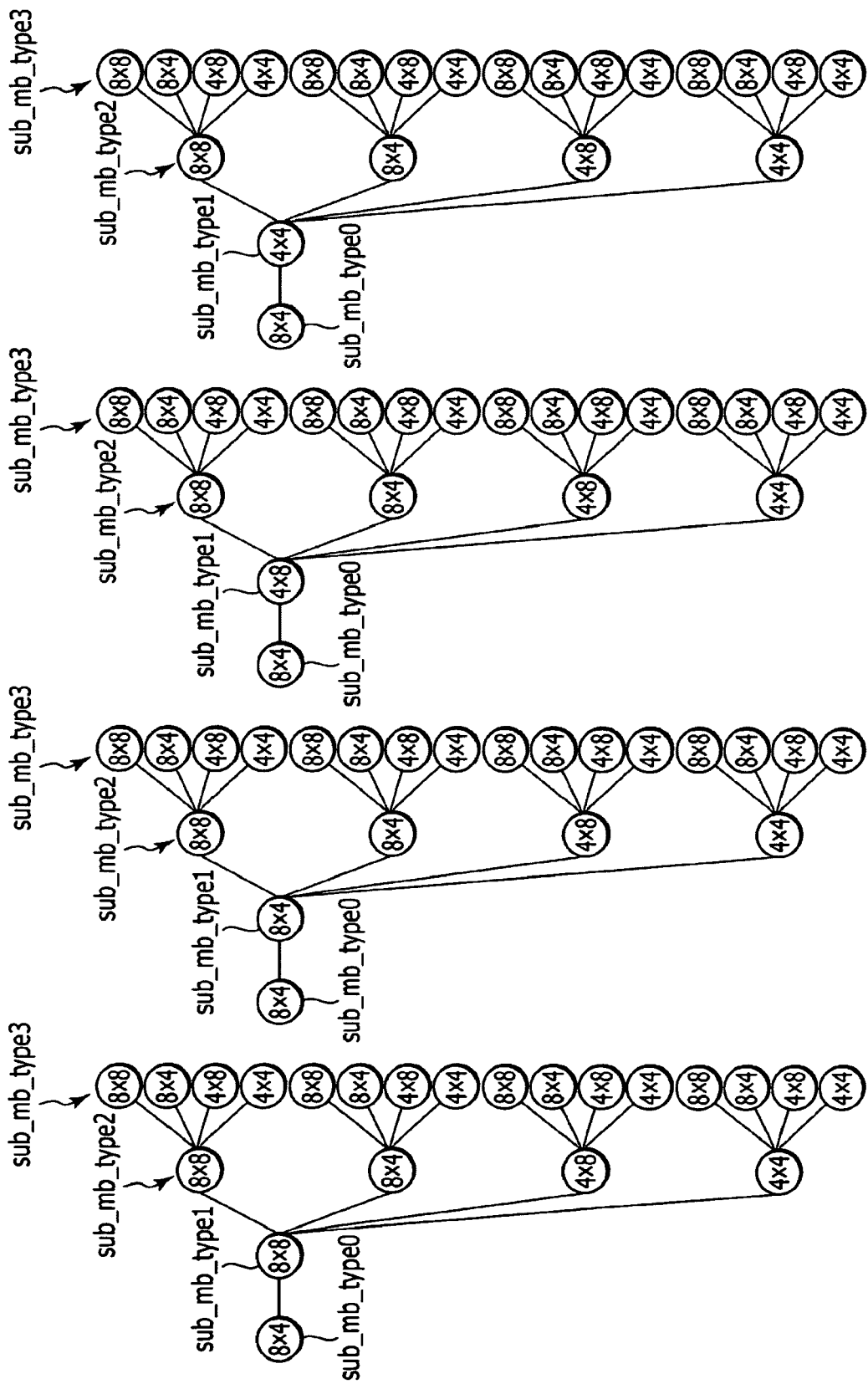
FIG. 22 is a schematic diagram showing combinations of submacro blocks in macro block having a size of 16×16 pixels.
Figure 23:
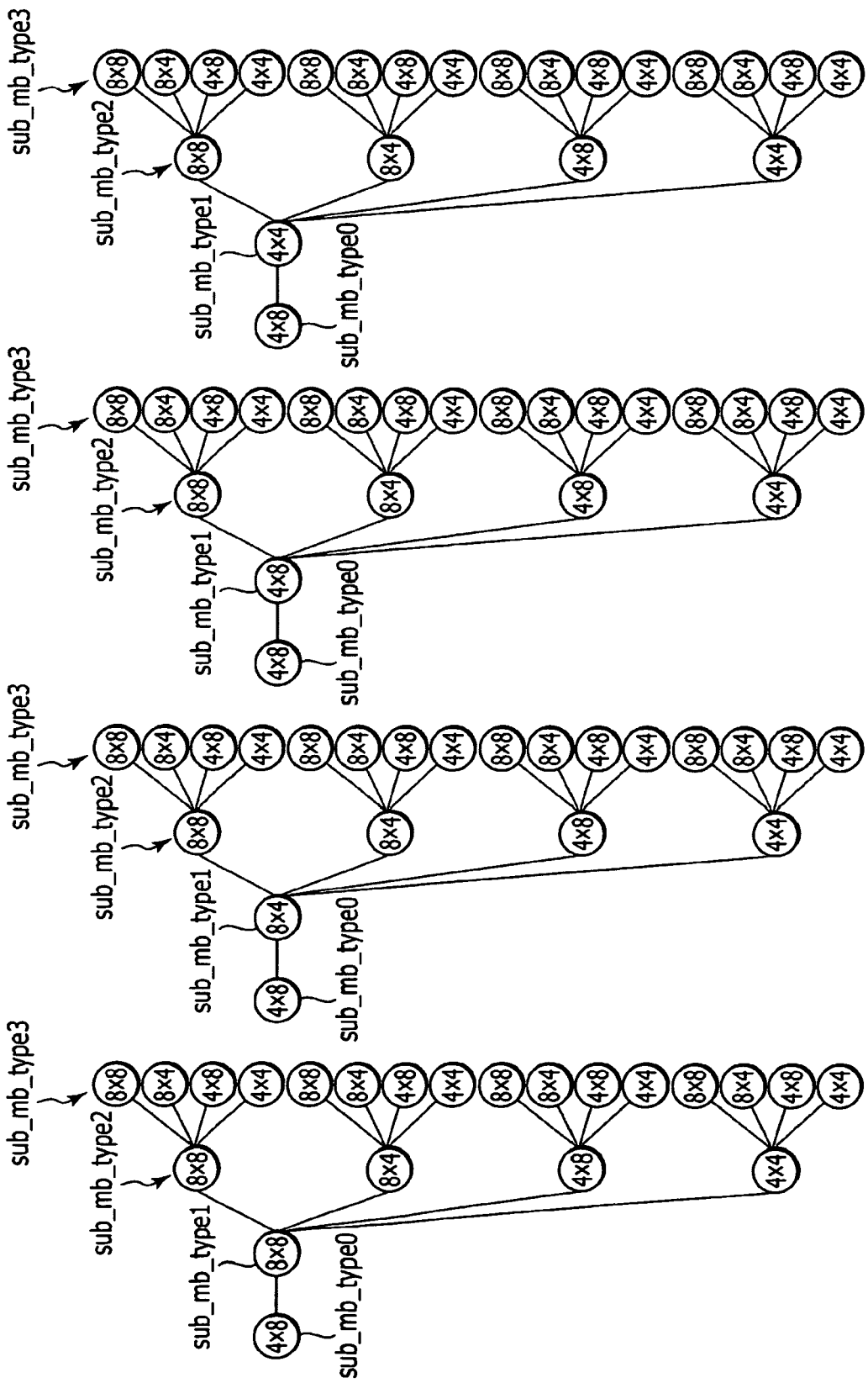
FIG. 23 is a schematic diagram showing combinations of submacro blocks in a macro block having a size of 16×16 pixels.
Figure 24:
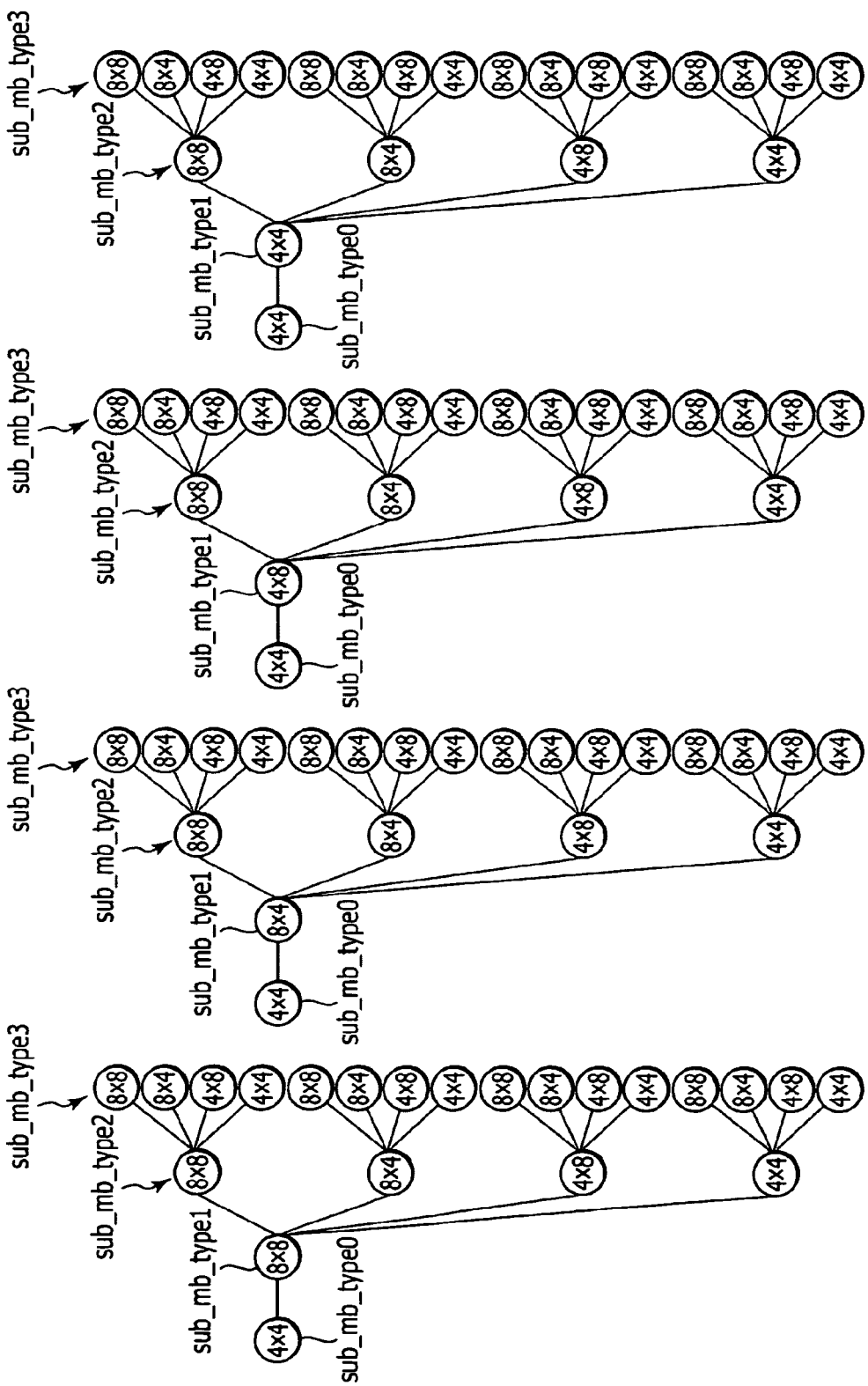
FIG. 24 is a schematic diagram showing combinations of submacro blocks in a macro block having a size of 16×16 pixels.

FIG. 19 illustrates an example of a process of acquiring a motion vector MV of the block D according to a modification of the embodiment. FIG. 19 corresponds to the process in Step S22 and following Steps for acquiring the motion vector MV of the block D illustrated in FIG. 11. As seen from comparison between FIGS. 19 and 11, in the modification of the embodiment, three judgment branch processes are added as compared to acquisition of the motion vector MV of the block C of the embodiment.

Namely, in the example shown in FIG. 19 it is judged whether the index value lft_idx[3:0] is any one of the values 4'd0 and 4'd8, or any one of the values 4'd2 and 4'd10, or any one of the values 4'd4 and 4'd12, or any one of the values 4'd6 and 4'd14, or any values of 4'd1, 4'd5, 4'd9 and 4'd13, or other values. On the basis of the judgment result, the index value nbd_idx[3:0] of the adjacent block is obtained.

More specifically, if it is judged that index value lft_idx[3:0] is any one of the values 4'd0 and 4'd8 (Step S220), the index value nbd_idx[3:0] of the adjacent block is obtained as an addition value of the index value lft_idx[3:0] and the value 4'd15 (Step S230). If it is judged that the index value lft_idx[3:0] is any one of the values 4'd2 and 4'd10 (Step S221), the index value nbd_idx[3:0] of the adjacent block is obtained as an addition value of the index value lft_idx[3:0] and the value 4'd3 (Step S231). If it is judged that the index value lft_idx[3:0] is any one of the values 4'd4 and 4'd12 (Step S222), the index value nbd_idx[3:0] of the adjacent block is obtained as an addition value of the index value lft_idx[3:0] and the value 4'd7 (Step S232).

If it is judged that the index value lft_idx[3:0] is any one of the values 4'd6 and 4'd14 (Step S223), the index value nbd_idx[3:0] of the adjacent block is obtained as an addition value of the index value lft_idx[3:0] and the value 4'd11 (Step S233). If it is judged that the index value lft_idx[3:0] is any one of the values 4'd1, 4'd5, 4'd9, and 4'd13 (Step S224), the index value nbd_idx[3:0] of the adjacent block is obtained as an addition value of the index value lft_idx[3:0] and the value 4'd9 (Step S234). If it is judged that the index value lft_idx[3:0] is a value other than these values, the index value nbd_idx[3:0] of the adjacent block is obtained as an addition value of the index value lft_idx[3:0] and the value 4'd15 (Step 235).

As described above, not the raster scan order but even if the encoding order of the intra prediction encoding stipulated, for example, in H.264|AVC is used as the index value definition, the processes of an embodiment of the present invention may be applied. However, in the modification of the embodiment, the number of judgment branch processes is larger than that of the index value definition of the raster scan order of the embodiment as described using FIGS. 16 to 19. Accordingly, the modification may have disadvantages such as processing speed and load as compared to an embodiment of the present invention.

Next, another modification of an embodiment of the present invention will be described briefly.

As already described, in the direct mode, motion information of the B picture can be predicted from an already encoded block. As a result, in order to be compatible with the direct mode, it would be necessary to store all generated motion vectors of a predetermined picture. In this case, in the macro block in the predetermined picture, the size of all motion compensation blocks may become 4×4 pixels. Accordingly, the direct mode memory 30 would be required to have a capacity of storing motion vectors having a possibility of being detected in a block of 4×4 pixels, in amount of one frame of 16 blocks per one macro block.

H.264|AVC stipulates a small scale profile called a Baseline profile not having a picture type of B picture. In the Baseline profile, a direct mode is not performed. As a result, in order to perform encoding in conformity with the Baseline profile, the memory for storing motion vectors is not necessary, but it is sufficient to store only motion vectors necessary for obtaining a prediction motion vector PMV in a memory.

Namely, in a system not having a picture type of B picture as in the Base profile, the memory connected to the mv storage unit 106 shown in FIG. 9 may have a configuration that the memory stores, for example, for the blocks B, C and D shown illustratively shown in FIG. 10, only the motion vectors MV at the index values 4'd12, 4'd13, 4'd14, and 4'd15, and for the block A, only the motion vectors MV at the index values of 4'd12, 4'd13, 4'd14, and 4'd15. It is therefore possible to reduce the capacity of the memory for storing motion vectors.

As described above, according to embodiments of the present invention, for the motion vector storage unit for storing a motion vector in a unit block area of a unit block, the unit block being defined by dividing one picture plane in a predetermined manner into macro blocks and further dividing each macro block in a predetermined manner, and the unit block being provided in the motion vector storage unit and being assigned an index value in the macro block in a predetermined order; a motion vector is stored in the unit block area, the motion vectors of left, upper and upper right or upper left adjacent blocks contacting the processing object block, existing in the same two-dimensional picture area as the processing object block, and being capable of having a plurality of different sizes are copied and stored in the unit block areas corresponding to the adjacent blocks in the motion vector storage unit, the index values corresponding the positions of the upper left corner and upper right corner of the processing object block for which the prediction vector is to be obtained are generated on the basis of the size of the processing object block capable of having a plurality of different sizes, the index value indicating the unit block area in the motion vector storage unit from which the motion vector is to be read is obtained, on the basis of the generated index values, and the prediction motion vector is obtained on the basis of the motion vector read from the motion vector storage unit on the basis of the index value. It is therefore advantageous in that it is unnecessary to consider the size of the corresponding adjacent block when the motion vector to be used for obtaining the prediction motion vector from the motion vector storage unit.

Further, according to embodiments of the present invention, in encoding a moving picture plane, for the motion vector storage unit for storing a motion vector in a unit block area of a unit block, the unit block being defined by dividing one picture plane in a predetermined manner into macro blocks and further dividing each macro block in a predetermined manner, and the unit block being provided in the motion vector storage unit and being assigned an index value in the macro block in a predetermined order; a motion vector is stored in the unit block area, the motion vectors of left, upper and upper right or upper left adjacent blocks contacting the processing object block, existing in the same two-dimensional picture area as the processing object block, and being capable of having a plurality of different sizes are copied and stored in the unit block areas corresponding to the adjacent blocks in the motion vector storage unit, the index values corresponding the positions of the upper left corner and upper right corner of the processing object block for which the prediction vector is to be obtained are generated on the basis of the size of the processing object block capable of having a plurality of different sizes, the index value indicating the unit block area in the motion vector storage unit from which the motion vector is to be read is obtained, on the basis of the generated index values, the prediction motion vector is obtained on the basis of the motion vector read from the motion vector storage unit on the basis of the index value, prediction vector data is generated on the basis of the prediction motion vector obtained by using the motion vector read in the motion vector read step and the motion vectors obtained for each block, and a difference between the prediction picture data and the input picture data is encoded. It is therefore advantageous in that it is unnecessary to consider the size of the corresponding adjacent block when the motion vector to be used for obtaining the prediction motion vector from the motion vector storage unit.

Furthermore, according to embodiments of the present invention, in decoding the encoded picture data obtained by encoding a difference between the prediction picture data obtained by encoding a difference between the motion vectors of each block and the prediction motion vector obtained by using the motion vectors, for the motion vector storage unit for storing a motion vector in a unit block area of a unit block, the unit block being defined by dividing one picture plane in a predetermined manner into macro blocks and further dividing each macro block in a predetermined manner, and the unit block being provided in the motion vector storage unit and being assigned an index value in the macro block in a predetermined order; a motion vector is stored in the unit block area, the motion vectors of left, upper and upper right or upper left adjacent blocks contacting the processing object block, existing in the same two-dimensional picture area as the processing object block, and being capable of having a plurality of different sizes are copied and stored in the unit block areas corresponding to the adjacent blocks in the motion vector storage unit, the index values corresponding the positions of the upper left corner and upper right corner of the processing object block for which the prediction vector is to be obtained are generated on the basis of the size of the processing object block capable of having a plurality of different sizes, the index value indicating the unit block area in the motion vector storage unit from which the motion vector is to be read is obtained, on the basis of the generated index values, the prediction motion vector is obtained on the basis of the motion vector read from the motion vector storage unit on the basis of the index value, prediction vector data is generated on the basis of the prediction motion vector obtained by using the motion vector read in the motion vector read step and the motion vectors obtained for each block, and an addition of the prediction picture data and the input picture data is decoded. Accordingly, it is advantageous in that it is unnecessary to consider the size of the corresponding adjacent block when the motion vector to be used for obtaining the prediction motion vector from the motion vector storage unit.

What is claimed is:

1. A data processing apparatus comprising:
a motion vector storage unit for storing a motion vector in a unit block area of each of a plurality of unit blocks, the unit blocks being defined by dividing one picture plane in a predetermined manner into macro blocks and further dividing each macro block in a predetermined manner, and the unit block area being assigned an index value in a predetermined order in the macro block;
an index value generating unit for generating the index values corresponding to a position of the unit blocks at an upper left corner and an upper right corner of an object block having one of a plurality of different macro types and submacro types for which a prediction motion vector is to be acquired, the generated index values being determined on the basis of the macro type and submacro type of the object block;
a storage control unit for copying a motion vector of an adjacent block for each of the unit block areas of the motion vector storage unit and storing the copied motion vectors in the unit block areas corresponding to the adjacent block of the motion vector storage unit, the adjacent block existing in a same two-dimensional picture area as the object block, contacting the object block at left side, upper side, upper right, or upper left and being capable of taking a plurality of different sizes; and
a motion vector reading unit for obtaining the index value indicating the unit block area of the motion vector storage unit from which the motion vector is to be read, on the basis of at least one of the index values generated by the index value generating unit, and at least one predetermined index value,
wherein the prediction motion vector is obtained on the basis of the motion vector read by the motion vector reading unit.

2. The data processing apparatus according to claim 1, wherein the index values are assigned to the unit block area of the motion vector storage unit in a raster scan order in the macro block.

3. The data processing apparatus according to claim 1, wherein the motion vector reading unit reads the motion vector from one of the unit block area of the motion vector storage unit.

4. The data processing apparatus according to claim 1, wherein:
the unit blocks are formed by dividing the macro block into four vertical and horizontal directions, respectively;
the motion vector reading unit obtains an index value indicating the unit block area from which the motion vector is to be read, by adding the at least one index value generated by the index value generating unit and the predetermined value; and
the index value indicating the unit block area from which the motion vector is to be read uses only four bits of the addition result on an LSB side.

5. A data processing method comprising steps of:
storing a motion vector in a unit block area of each of a plurality of unit blocks, the unit blocks being defined by dividing one picture plane in a predetermined manner into macro blocks and further dividing each macro block in a predetermined manner, and the unit block area being provided in a motion vector storage unit and being assigned an index value in a predetermined order in the macro block;

generating the index values corresponding to a position of the unit blocks at an upper left corner and an upper right corner of an object block having one of a plurality of different macro types and submacro types for which a prediction motion vector is to be acquired, the generated index values being determined on the basis of the macro type and submacro type of the object block;

copying a motion vector of an adjacent block for each of the unit block area of the motion vector storage unit and storing the copied motion vectors in the unit block areas corresponding to the adjacent block of the motion vector storage unit, the adjacent block existing in a same two-dimensional picture area as the object block, contacting the object block at left side, upper side, upper right, or upper left and being capable of taking a plurality of different sizes;

reading a motion vector for obtaining the index value indicating the unit block area of the motion vector storage unit from which the motion vector is to be read, on the basis of at least one of the index values generated by the index value generating step, and at least one predetermined index value; and obtaining the prediction motion vector on the basis of the motion vector read by the motion vector reading step.

6. A non-transitory computer-readable recording medium which stores a data processing program for making a computer execute a data processing method, the data processing method comprising steps of:

storing a motion vector in a unit block area of each of a plurality of unit blocks, the unit blocks being defined by dividing one picture plane in a predetermined manner into macro blocks and further dividing each macro block in a predetermined manner, and the unit block area being provided in a motion vector storage unit and being assigned an index value in a predetermined order in the macro block;

generating the index values corresponding to a position of the unit blocks at an upper left corner and an upper right corner of an object block having one of a plurality of different macro types and submacro types for which a prediction motion vector is to be acquired, the generated index values being determined on the basis of the macro type and submacro type of the object block;

copying a motion vector of an adjacent block for each of the unit block areas of the motion vector storage unit and storing the copied motion vectors in the unit block area corresponding to the adjacent block of the motion vector storage unit, the adjacent block existing in a same two-dimensional picture area as the object block, contacting the object block at left side, upper side, upper right, or upper left and being capable of taking a plurality of different sizes;

reading a motion vector for obtaining the index value indicating the unit block area of the motion vector storage unit from which the motion vector is to be read, on the basis of at least one of the index values generated by the index value generating step, and at least one predetermined index value; and obtaining the prediction motion vector on the basis of the motion vector read by the motion vector reading step.

7. An encoding apparatus for encoding moving picture data, the apparatus comprising:

a motion vector storage unit for storing a motion vector in a unit block area of each of a plurality of unit blocks, the unit blocks being defined by dividing one picture plane in a predetermined manner into macro blocks and further dividing each macro block in a predetermined manner, and the unit block area being assigned an index value in a predetermined order in the macro block;

an index value generating unit for generating the index values corresponding to a position of the unit blocks at an upper left corner and an upper right corner of an object block having one of a plurality of different macro types and submacro types for which a prediction motion vector is to be acquired, the generated index values being determined on the basis of the macro type and submacro type of the object block;

a storage control unit for copying a motion vector of an adjacent block for each of the unit block areas of the motion vector storage unit and storing the copied motion vectors in the unit block area corresponding to the adjacent block of the motion vector storage unit, the adjacent block existing in a same two-dimensional picture area as the object block, contacting the object block at left side, upper side, upper right, or upper left and being capable of taking a plurality of different sizes; and a motion vector reading unit for obtaining the index value indicating the unit block area of the motion vector storage unit from which the motion vector is to be read, on the basis of at least one of the index values generated by the index value generating unit, and at least one predetermined index value, wherein the prediction motion vector is generated on the basis of the motion vector read by the motion vector reading unit, prediction picture data is generated on the basis of the motion vector obtained for each block, and a difference between the prediction picture data and input picture data is encoded.

8. The data processing apparatus according to claim 7, wherein the index values are assigned to the unit block area of the motion vector storage unit in a raster scan order in the macro block.

9. The data encoding apparatus according to claim 7, wherein the motion vector reading unit reads the motion vector from one of the unit block areas of the motion vector storage unit.

10. The data encoding apparatus according to claim 7, wherein:

the unit blocks are formed by dividing the macro block into four vertical and horizontal directions, respectively;

the motion vector reading unit obtains an index value indicating the unit block area from which the motion vector is to be read, by adding the at least one index value generated by the index value generating unit and the predetermined value; and the index value indicating the unit block area from which the motion vector is to be read uses only four bits of the addition result on an LSB side.

11. The encoding apparatus according to claim 7, further comprising a storage unit used to share with the motion vector storage unit, the storage unit being for storing an encoded picture data by using a direct mode of direct prediction of a block in picture data by using corresponding blocks of encoded picture data whose encoding order is before the picture data and whose display order is before and/or after the picture data.

12. A method for encoding moving picture data, the method comprising steps of:

storing a motion vector in a unit block area of each of a plurality of unit blocks, the unit blocks being defined by dividing one picture plane in a predetermined manner into macro blocks and further dividing each macro block in a predetermined manner, and the unit block areas being provided in a motion vector storage unit and being assigned an index value in a predetermined order in the macro block;

generating the index values corresponding to a position of the unit blocks at an upper left corner and an upper right corner of an object block having one of a plurality of different macro types and submacro types for which a prediction motion vector is to be acquired, the generated index values being determined on the basis of the macro type and submacro type of the object block;

copying a motion vector of an adjacent block for each of the unit block areas of the motion vector storage unit and storing the copied motion vectors in the unit block areas corresponding to the adjacent block of the motion vector storage unit, the adjacent block existing in a same two-dimensional picture area as the object block, contacting the object block at left side, upper side, upper right, or upper left and being capable of taking a plurality of different sizes;

reading a motion vector for obtaining the index value indicating the unit block area of the motion vector storage unit from which the motion vector is to be read, on the basis of at least one of the index values generated by the index value generating step, and at least one predetermined index value; and obtaining the prediction motion vector on the basis of the motion vector read by the motion vector reading step, wherein the prediction motion vector is generated on the basis of the motion vector read by the motion vector reading step, prediction picture data is generated on the basis of the motion vector obtained for each block, and a difference between the prediction picture data and input picture data is encoded.

13. A non-transitory computer-readable recording medium which stores an encoding program for making a computer execute a method of encoding moving picture data, comprising the steps of:

storing a motion vector in a unit block area of each of a plurality of unit blocks, the unit blocks being defined by dividing one picture plane in a predetermined manner into macro blocks and further dividing each macro block in a predetermined manner, and the unit block areas being provided in a motion vector storage unit and being assigned an index value in a predetermined order in the macro block;

generating the index values corresponding to a position of the unit blocks at an upper left corner and an upper right corner of an object block having one of a plurality of different macro types and submacro types for which a prediction motion vector is to be acquired, the generated index values being determined on the basis of the macro type and submacro type of the object block;

copying a motion vector of an adjacent block for each of the unit block areas of the motion vector storage unit and storing the copied motion vectors in the unit block areas corresponding to the adjacent block of the motion vector storage unit, the adjacent block existing in a same two-dimensional picture area as the object block, contacting the object block at left side, upper side, upper right, or upper left and being capable of taking a plurality of different sizes;

reading a motion vector for obtaining the index value indicating the unit block area of the motion vector storage unit from which the motion vector is to be read, on the basis of at least one of the index values generated by the index value generating step, and at least one predetermined index value; and obtaining the prediction motion vector on the basis of the motion vector read by the motion vector reading step, wherein the prediction motion vector is generated on the basis of the motion vector read by the motion vector reading step, prediction picture data is generated on the basis of the motion vector obtained for each block, and a difference between the prediction picture data and input picture data is encoded.

14. A decoding apparatus for decoding encoded picture data obtained by encoding a difference between prediction picture data generated on the basis of a motion vector obtained for each block and prediction picture data generated on the basis of a prediction motion vector obtained by using the motion vector and picture data inputted, comprising:

a motion vector storage unit for storing a motion vector in a unit block area of each of a plurality of unit blocks, the unit blocks being defined by dividing one picture plane in a predetermined manner into macro blocks and further dividing each macro block in a predetermined manner, and the unit block areas being assigned an index value in a predetermined order in the macro block;

an index value generating unit for generating the index values corresponding to a position of the unit blocks at an upper left corner and an upper right corner of an object block having one of a plurality of different macro types and submacro types for which a prediction motion vector is to be acquired, the generated index values being determined on the basis of the macro type and submacro type of the object block;

a storage control unit for copying a motion vector of an adjacent block for each of the unit block areas of the motion vector storage unit and storing the copied motion vectors in the unit block areas corresponding to the adjacent block of the motion vector storage unit, the adjacent block existing in a same two-dimensional picture area as the object block, contacting the object block at left side, upper side, upper right, or upper left and being capable of taking a plurality of different sizes; and a motion vector reading unit for obtaining the index value indicating the unit block area of the motion vector storage unit from which the motion vector is to be read, on the basis of at least one of the index values generated by the index value generating unit, and at least one predetermined index value, wherein the prediction picture data is generated on the basis of the prediction motion vector and the motion vector obtained for each block, the motion vector being obtained using the motion vector read by the motion vector reading unit, and a decoding process is performed by an addition of the prediction picture data and a coded picture data inputted.

15. The decoding apparatus according to claim 14, wherein the index values are assigned to the unit block area of the motion vector storage unit in a raster scan order in the macro block.

16. The decoding apparatus according to claim 14, wherein the motion vector reading unit reads the motion vector from one of the unit block area of the motion vector storage unit.

17. The decoding apparatus according to claim 14, wherein:

the unit blocks are formed by dividing the macro block into four vertical and horizontal directions, respectively;

the motion vector reading unit obtains an index value indicating the unit block area from which the motion vector is to be read, by adding the at least one index value generated by the index value generating unit and the predetermined value; and the index value indicating the unit block area from which the motion vector is to be read uses only four bits of the addition result on an LSB side.

18. The decoding apparatus according to claim 14, further comprising a storage unit used to share with the motion vector storage unit, the storage unit being for storing an encoded picture data by using a direct mode of direct prediction of a block in picture data by using corresponding blocks of encoded picture data whose encoding order is before the picture data and whose display order is before and/or after the picture data.

19. A method for decoding encoded picture data obtained by encoding a difference between prediction picture data generated on the basis of a motion vector obtained for each block and prediction picture data generated on the basis of a prediction motion vector obtained by using the motion vector and picture data inputted, the method comprising the steps of:

storing a motion vector in a unit block area of each of a plurality of unit blocks, the unit blocks being defined by dividing one picture plane in a predetermined manner into macro blocks and further dividing each macro block in a predetermined manner, and the unit block area being provided in a motion vector storage unit and being assigned an index value in a predetermined order in the macro block;

generating the index values corresponding to a position of the unit blocks at an upper left corner and an upper right corner of an object block having one of a plurality of different macro types and submacro types for which a prediction motion vector is to be acquired, the generated index values being determined on the basis of the macro type and submacro type of the object block;

copying a motion vector of an adjacent block for each of the unit block area of the motion vector storage unit and storing the copied motion vectors in the unit block area corresponding to the adjacent block of the motion vector storage unit, the adjacent block existing in a same two-dimensional picture area as the object block, contacting the object block at left side, upper side, upper right, or upper left and being capable of taking a plurality of different sizes;

reading a motion vector for obtaining the index value indicating the unit block area of the motion vector storage unit from which the motion vector is to be read, on the basis of at least one of the index values generated by the index value generating step, and at least one predetermined index value; and obtaining the prediction motion vector on the basis of the motion vector read by the motion vector reading step, wherein prediction picture data is generated on the basis of the prediction motion vector and a motion vector obtained for each block, the prediction motion vector being generated on the basis of the motion vector read by the motion vector reading step, and a decoding process is performed by an addition of the prediction picture data and picture data inputted.

20. A non-transitory computer-readable recording medium which stores a decoding program for making a computer execute a decoding method for decoding encoded picture data obtained by encoding a difference between prediction picture data generated on the basis of a motion vector obtained for each block and prediction picture data generated on the basis of a prediction motion vector obtained by using the motion vector and input picture data, the decoding method comprising the steps of:

storing a motion vector in a unit block area of each of a plurality of unit blocks, the unit blocks being defined by dividing one picture plane in a predetermined manner into macro blocks and further dividing each macro block in a predetermined manner, and the unit block areas being provided in a motion vector storage unit and being assigned an index value in a predetermined order in the macro block;

generating the index values corresponding to a position of the unit blocks at an upper left corner and an upper right corner of an object block having one of a plurality of different macro types and submacro types for which a prediction motion vector is to be acquired, the generated index values being determined on the basis of the macro type and submacro type of the object block;

copying a motion vector of an adjacent block for each of the unit block area of the motion vector storage unit and storing the copied motion vectors in the unit block areas corresponding to the adjacent block of the motion vector storage unit, the adjacent block existing in a same two-dimensional picture area as the object block, contacting the object block at left side, upper side, upper right, or upper left and being capable of taking a plurality of different sizes;

reading a motion vector for obtaining the index value indicating the unit block area of the motion vector storage unit from which the motion vector is to be read, on the basis of at least one of the index values generated by the index value generating step, and at least one predetermined index value; and obtaining the prediction motion vector on the basis of the motion vector read by the motion vector reading step, wherein prediction picture data is generated on the basis of the prediction motion vector and a motion vector obtained for each block, the prediction motion vector being generated on the basis of the motion vector read by the motion vector reading step, and a decoding process is performed by an addition of the prediction picture data and picture data inputted.

* * * * *